United States Patent
Kleider et al.

(10) Patent No.: US 6,240,282 B1
(45) Date of Patent: May 29, 2001

(54) APPARATUS FOR PERFORMING NON-LINEAR SIGNAL CLASSIFICATION IN A COMMUNICATIONS SYSTEM

(75) Inventors: John Eric Kleider, Scottsdale; Chad Scott Bergstrom, Chandler, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/114,321

(22) Filed: Jul. 13, 1998

(51) Int. Cl.$^7$ .............................. H04B 17/00; H04B 15/00
(52) U.S. Cl. ......................................... 455/226.1; 375/285
(58) Field of Search ........................... 455/226.1; 375/285

(56) References Cited

U.S. PATENT DOCUMENTS

| | | | |
|---|---|---|---|
| 4,227,255 | 10/1980 | Carrick et al. | 455/226 |
| 4,259,663 | 3/1981 | Gable | 340/147 |
| 4,271,523 | 6/1981 | Gable | 371/57 |
| 4,597,107 | 6/1986 | Ready et al. | 455/226 |
| 4,979,211 | 12/1990 | Benvenuto et al. | 381/43 |
| 5,390,136 | 2/1995 | Wang | 364/754 |
| 6,084,919 | * 7/2000 | Kleider et al. | 375/285 |

FOREIGN PATENT DOCUMENTS

WO 99/39444 * 8/1999 (WO) .

OTHER PUBLICATIONS

Text entitled "Automatic Modulation Recognition Of Communicaiton Signals" by Elsayed Azzovz et al., Chapter 5, pp. 132–176, KAP 1996.

* cited by examiner

Primary Examiner—William Cumming
(74) Attorney, Agent, or Firm—Frankl J. Bogacz; Maurice J. Jones

(57) ABSTRACT

A non-linear signal classifier (26) includes a polynomial expansion unit for expanding signal feature vectors determined by a feature extraction unit (25) for a received signal. The expanded signal feature vectors are each combined with a plurality of signal classification models that are stored in a model memory (76). The signal classification models are each associated with a particular signal type that is recognized by the non-linear signal classifier. A scoring unit (72) generates a score for each of the signal classification models based on the result of the combination. The scores are analyzed by a selection unit (74) which determines which of the signal classification models (i.e., which of the signal types) most likely represents the received signal. Training equipment (60) is also provided for training the non-linear signal classifier (26) to recognize new signal types. In one embodiment, the training equipment (60) is capable of adding a new signal classification model to the model memory (76) without modifying other models stored therein.

42 Claims, 15 Drawing Sheets

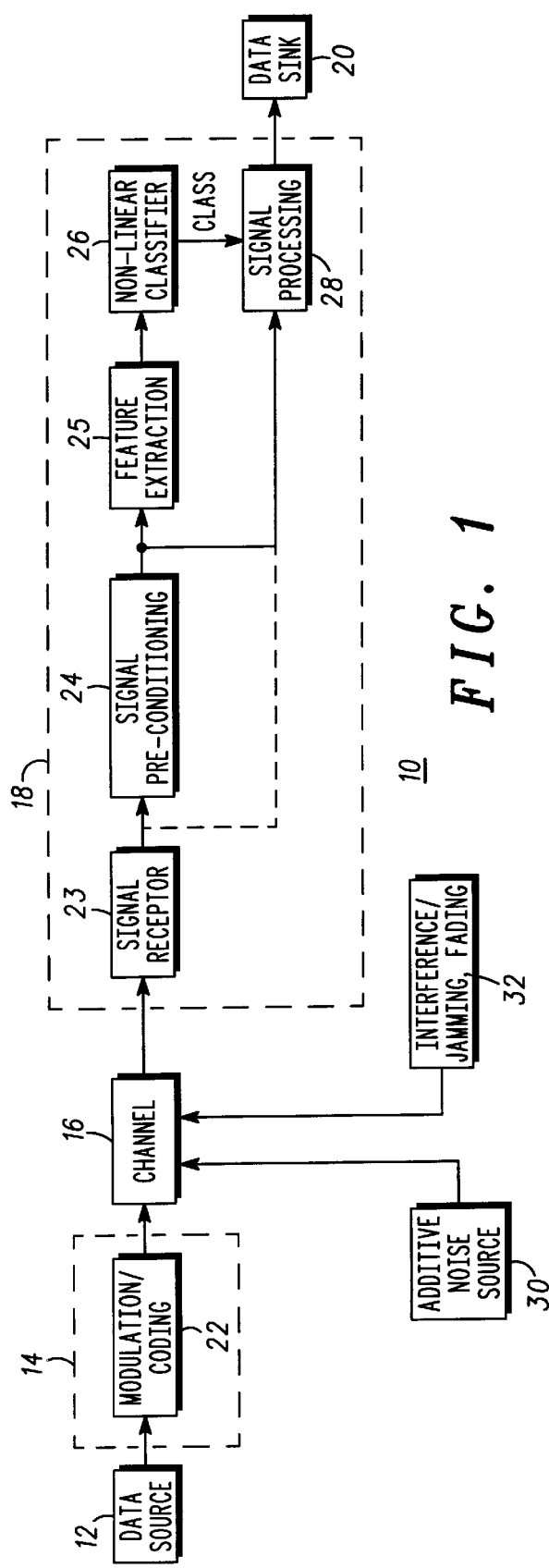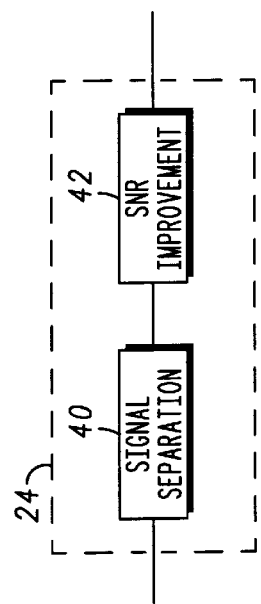

APPARATUS FOR PERFORMING NON-LINEAR SIGNAL CLASSIFICATION IN A COMMUNICATIONS SYSTEM

FIELD OF THE INVENTION

The invention relates in general to communications systems and, more particularly, to communications systems that utilize signal classification in a receiver unit.

BACKGROUND OF THE INVENTION

A signal classifier is a device that analyzes an input signal to determine which of a plurality of signal classes the signal belongs to. Signal classifiers have been used in communications systems to, among other things, classify signals received from a communications channel to determine how to properly process the signals. For example, a receiver needs to know the type of modulation present in a received signal to properly demodulate the signal. A signal classifier can be used to determine the modulation type so that a proper demodulation method can be selected.

In general, all signal classifiers examine signal feature differences to discriminate between signal classes. A cluttered, interference-laden environment tends to reduce the possible resolution between signal classes, resulting in a situation where similar signal classes are difficult to distinguish. For this reason, many prior-art signal classifiers perform poorly in noisy environments. In addition, many prior-art signal classifiers use "signal-specific" procedures and signal processing steps that preclude addition or deletion of signals-of-interest.

Prior-art signal classifiers are also very computationally complex. That is, known classifiers normally require a relatively large amount of computation time in a system processor. As can be appreciated, the computational complexity of these signal classifiers can slow down system operation significantly and may require the use of additional or more powerful (and more expensive) processors. In addition, execution of these complex signal classification methods in a processor generally consumes a relatively large amount of electrical power, making the methods undesirable for use in applications where power is scarce (e.g., satellite and handheld applications).

In addition to the above, prior-art signal classifiers are relatively difficult to train (i.e., to teach the classifier to recognize different signal classes). For example, these signal classifiers generally require retraining or software restructuring for all signal classifications whenever a new signal classification is added to the system. In addition, prior-art signal classifiers typically require complex feature set extraction, are not adaptive to varying modulation types or multiplexing types, and/or are highly sensitive to communication channel effects.

Therefore, a need exists for a method and apparatus for performing discriminative signal classification in a communications system that is reliable, of relatively low complexity, and which provides a high level of discrimination between signal classes. In addition, a need exists for flexible classification methods that provide for the addition of new signal classes or the removal of undesired signal classes without the need for extensive system reconfiguration.

BRIEF DESCRIPTION OF THE DRAWINGS

FIG. 1 is a block diagram illustrating a communication system in accordance with one embodiment of the present invention;

FIG. 2 is a block diagram illustrating the signal preconditioning unit of FIG. 1 in one embodiment of the present invention;

DETAILED DESCRIPTION OF THE DRAWINGS

Figure 3:
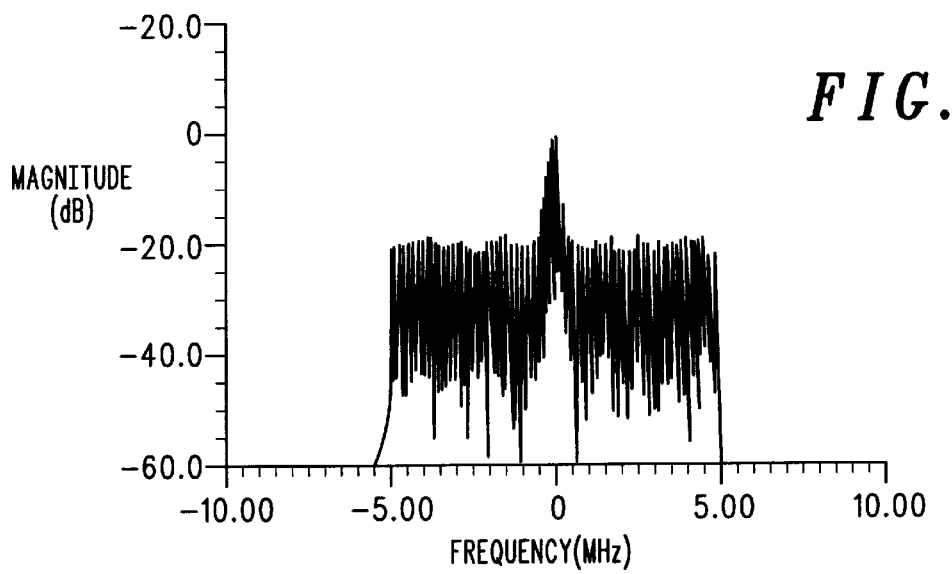
FIGS. 3–7 are graphs illustrating a method for performing preclassification filtering in accordance with one embodiment of the present invention.
Figure 4:
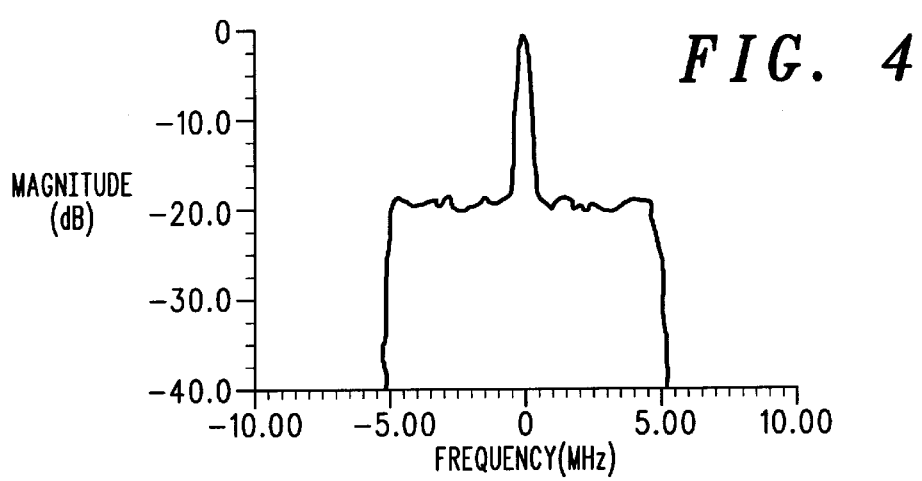

The present invention relates to a communications system that includes a non-linear signal classifier for classifying communications signals. The non-linear signal classifier includes a polynomial expansion unit for performing a non-linear expansion of signal features extracted from a signal. The expanded features are combined with each of a plurality of stored signal classification models that are each associated with a particular signal type. The results of the combinations are then analyzed to determine the signal type of the subject signal. The non-linear signal classifier of the present invention can also include training equipment for providing the plurality of signal classification models. In a preferred embodiment, the training equipment is capable of adding signal classification models for new signal classes without requiring modification of signal classification models already stored in the model memory, thereby greatly simplifying the training process.

The present invention is of relatively low complexity and, as such, reduces the level of computation (and the amount of memory) required to perform discriminative pattern recognition. The invention is readily implemented in a communications system containing at least one digital signal processor (DSP) or similar processing device. The invention is also capable of low power operation, making it suitable for use in battery powered, hand-held or manpack communicators. In addition, the invention is capable of achieving high-resolution signal classification and, in a preferred embodiment, is implemented in a multi-resolutional mode having a plurality of different classification levels.

FIG. 1 is a block diagram illustrating a communications system 10 in accordance with one embodiment of the present invention. It should be appreciated that the blocks of FIG. 1 (as well as the blocks in the other block diagrams disclosed herein) represent functional elements and are not intended to represent discrete hardware elements. For example, in one embodiment of the invention, many of the functions illustrated in FIG. 1 are implemented in a single processor unit. The functions can all be implemented in hardware, all in software, or a combination of hardware and software can be used.

As shown in FIG. 1, the communications system 10 includes: a data source 12, a transmitter 14, a channel 16, a receiver 18, and a data sink 20. The data source 12 delivers a data signal to the transmitter 14 which processes the data to create a transmit signal that is delivered to the channel 16. The receiver 18 receives a signal from the channel 16, which is a modified version of the transmit signal, and processes the signal to recover the original data. The recovered data is delivered to the data sink 20.

The data source 12 can include virtually any type of information source. That is, the data source 12 can provide, for example, audio information (such as speech), computer data, or video information. In one embodiment, the data source 12 comprises a microphone for converting speech into an analog electrical signal indicative thereof.

The transmitter 14 includes, among other things, a modulation/coding unit 22 for applying modulation and/or coding to the data from the data source 12 as will be familiar to those of skill in the art. For example, the modulation/coding unit 22 can apply source coding, channel coding, interleaving, various forms of modulation and/or up conversion to the data signal. In a spread spectrum system, the modulation/coding unit 22 can also apply signal spreading to the signal using methods that are well known in the art (such as direct sequence and frequency hopping).

In a preferred embodiment of the present invention, the channel 16 is a wireless RF link. It should be appreciated, however, that the principles of the present invention can be implemented in communications systems having virtually any type of channel, including both wired and wireless channels. As illustrated in FIG. 1, the channel 16 can include an additive noise source 30 and an interference/jamming source 32. Signals from the additive noise source 30 and/or the interference/jamming source 32 combine with the transmit signal in the channel 16 to produce the modified signal that is received by the receiver 18.

The receiver 18 includes: a signal receptor 23, a signal pre-conditioning unit 24, a feature extraction unit 25, a non-linear signal classifier 26, and a signal processing unit 28. The receiver 18 receives a signal from the channel 16 in the signal receptor 23, which can include any type of signal receiving device, such as an antenna or line buffer. The signal pre-conditioning unit 24 processes the received signal in a predetermined manner to condition the signal for parameter extraction and classification. The feature extraction unit 25 then processes the signal to derive certain features from the signal that are useful in classifying the signal. The non-linear signal classifier 26 then classifies the signal using the features derived by the feature extraction unit 25 and outputs a signal indicative of the most likely signal classification to the signal processing unit 28. In addition to classifying the signal-of-interest, the non-linear signal classifier 26 can also classify interference components within the received signal for use in interference mitigation. After the received signal has been classified, the signal processing unit 28 processes the signal in accordance with the signal classification to recover the original information for delivery to the data sink 20. The signal processing unit 28 can include, but is not limited to, demodulation and/or interference mitigation functions. In one embodiment of the present invention, the feature extraction unit 25 includes a dedicated non-linear signal classifier (in addition to non-linear signal classifier 26) for use in extracting features from the received signal.

As described above, the signal pre-conditioning unit 24 conditions the received signal for feature extraction and signal classification in the feature extraction unit 25 and the non-linear signal classifier 26, respectively. In a preferred embodiment, as illustrated in FIG. 2, the signal pre-conditioning unit 24 includes a signal separation unit 40 and a signal-to-noise ratio (SNR) improvement unit 42. The signal separation unit 40 is operative for separating a desired signal component in the received signal from interference components in the signal that can include other undesired communication signals. For example, the signal separation unit 40 can be used to separate a desired frequency shift keying (FSK) component from an undesired phase shift keying (PSK) interference component. Both the desired component and the undesired component can then be subjected to signal classification. Signal separation can be performed by any known method for separating combined signals.

The SNR improvement unit 42 is operative for reducing the SNR of the separated (i.e., desired) signal component before classification is performed. Because subsequent processing is non-linear, it is desirable that the SNR improvement unit 42 increase the SNR of the desired signal before further processing is performed. Two possible methods for performing SNR improvement are preclassification filtering and phase domain filtering. In a preferred embodiment of the present invention, both methods are employed in the SNR improvement unit 42.

Figure 5:
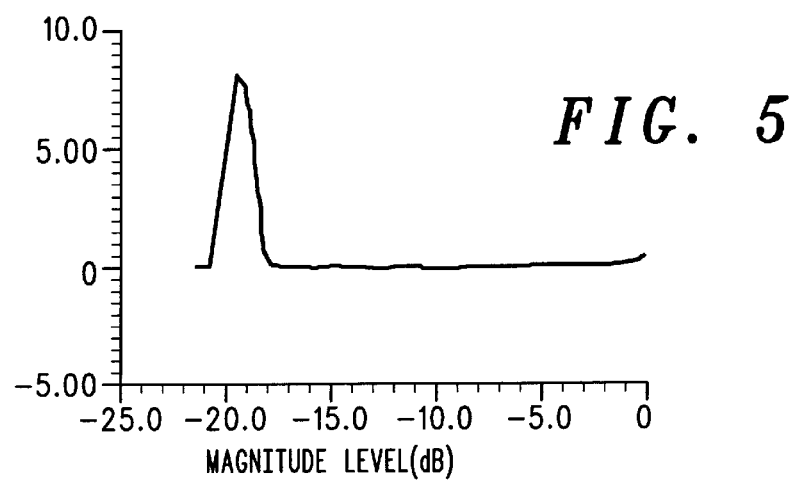
Figure 6:
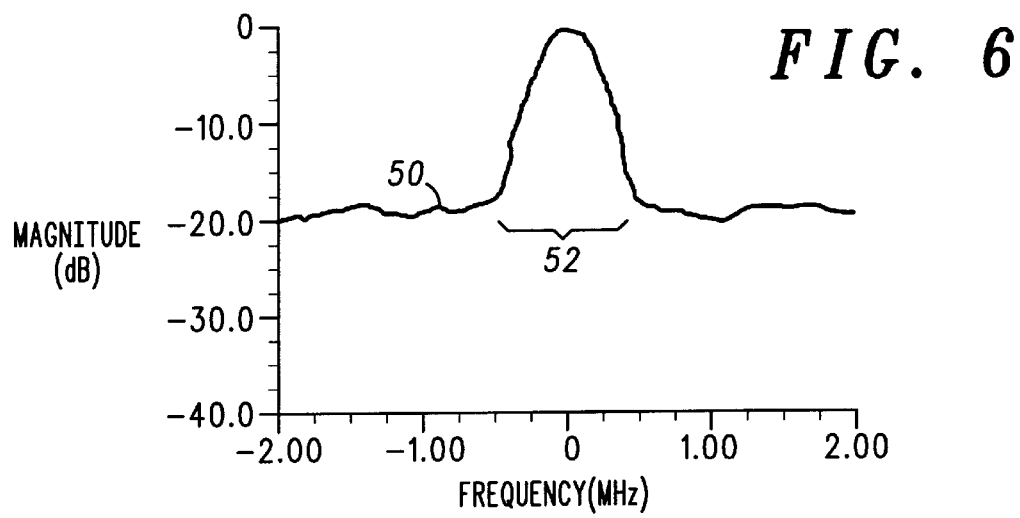
Figure 7:
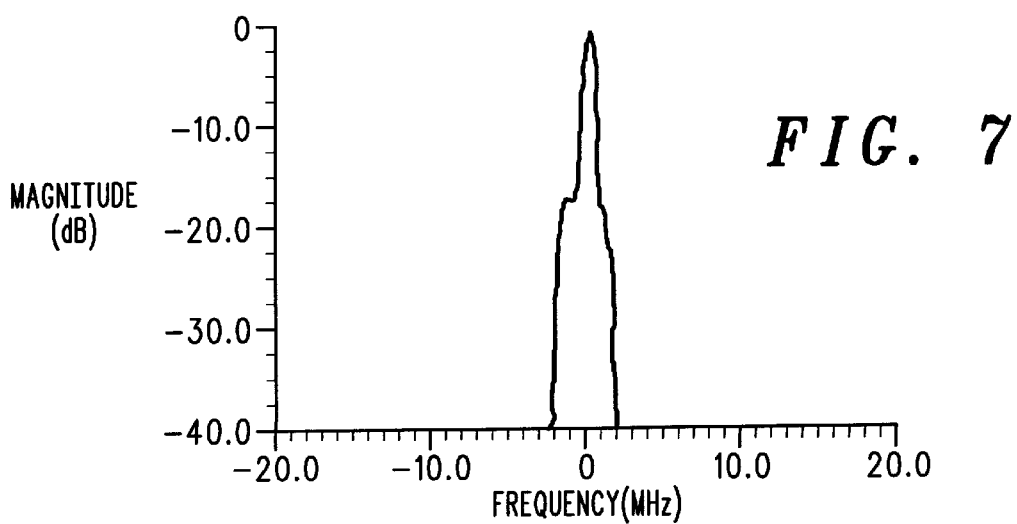

In one approach, preclassification filtering is performed by isolating a partial band or narrow band signal of interest, estimating the bandwidth of the signal of interest, and prefiltering the signal of interest before classification functions are invoked. FIGS. 3–7 illustrate this approach for a minimum shift keying (MSK) signal. First, as illustrated in FIG. 3, the signal of interest is converted into a frequency domain representation using a frequency transformation, such as a discrete Fourier transform (DFT) or a fast Fourier transform (FFT). The frequency coefficients found using the frequency transformation are converted to power spectrum and smoothed by a moving average filter, or similar device, to achieve the smooth spectrum illustrated in FIG. 4. The smooth spectrum is histogrammed, as illustrated in FIG. 5, to determine the noise floor level of the signal of interest (i.e., the peak of the histogram). Using the peak spectrum location from the histogram as the location of the signal noise floor 50, the signal bandwidth at the noise power level is measured as illustrated in FIG. 6 by setting the noise floor location as a bandwidth detection threshold, producing bandwidth 52. This width is corrected to a null-to-null bandwidth by assuming the signal spectrum shape as sin (x)/x and utilizing the peak SNR reference to determine where on the sin(x)/x curve the width was measured. FIG. 7 illustrates the spectrum of the MSK signal after the prefiltering operation.

As described previously, phase domain filtering is another technique that can be used to improve SNR in the SNR improvement unit 42. Phase domain filtering involves filtering the de-aliased phase components of the signal of interest using, for example, a moving average filter or other filter type. Phase de-aliasing may be performed by methods known to those of skill in the art. If a moving average filter is used, the filter should possess sufficient bandwidth to prevent excessive distortion of the signal of interest. In one embodiment of the present invention, a three point moving average filter was found to possess sufficient bandwidth although other embodiments may also be appropriate. The following equation describes one embodiment of a discrete time averaging filter that may be used to perform phase domain filtering:

$$y(n) = \frac{1}{(M+1)} \sum_{m=0}^{M} x(n-m) \qquad \text{Eq. 1}$$

The moving average filter is preferably applied repeatedly to the signal of interest. Phase domain filtering is effective on M-ary FSK, MSK, and M-ary PSK signals, although application to other signal types is also appropriate.

Referring back to FIG. 1, the feature extraction unit 25 processes the signal received from the SNR improvement unit 42 to derive certain features and parameters from the signal. These features and parameters are delivered to the non-linear signal classifier 26 for use in classifying the signal. It should be appreciated that some features and parameters may need to be extracted before signal separation and/or SNR improvement are performed in the signal pre-conditioning unit 24. Therefore, appropriate parameter extraction blocks may also be used in the signal pre-conditioning unit 24. In one embodiment of the present invention, the feature extraction unit 25 performs an efficient data analysis using circa 50 (i.e., symbol) data transitions. For extremely low baud rates, feature extraction unit 25 may also perform a feature accumulation function whereby features of contiguous signal sources are saved until sufficient data transitions have been accumulated for identification.

In a preferred approach, a general-purpose set of classification features are computed by the feature extraction unit 25. For example, in one embodiment, the following feature set is output by the feature extraction unit 25:

%  instantaneous frequency bandwidth
discrete frequency steps
center frequency
% amplitude excursion
discrete amplitude steps
mean amplitude
% discriminator steps
discrete phase modes
mean discriminant value
peak signal envelope to mean value
peak signal envelope to RMS value
signal baud rate
adaptive filter class The adaptive filter class feature supports superclass or multi-resolutional feature extraction.

Classification features can be computed in the feature extraction unit 25 using one or more of a plurality of feature plane transformations. In one embodiment, the feature plane transformations are computed from a joint time-frequency (JTF) matrix H of order n,m where n represents a contiguous time index and m represents a contiguous spectral index. The JTF matrix can be represented as follows:

$$H = \begin{bmatrix} h(0,0) & h(1,0) & h(2,0) & \cdots & h(m-1,0) \\ h(0,1) & & & & \\ h(0,2) & & \ddots & & \\ \vdots & & & & \vdots \\ h(0,n-1) & & \cdots & & h(m-1,n-1) \end{bmatrix} \qquad \text{Eq. 2}$$

The feature plane transformations are performed by using the JTF matrix H to compute a plurality of transformations. The following are some transformation matrices, TN, that may be used in this regard (although other similar transformations can also be used):

Transformation Matrix 1     Eq. 3

$$T1 = \begin{bmatrix} a(0,1) & a(0,2) & a(0,3) & & a(0,m-1) \\ 0 & a(1,2) & a(1,3) & & a(1,m-1) \\ 0 & 0 & a(2,3) & & a(2,m-1) \\ \vdots & & & \ddots & \vdots \\ 0 & & \cdots & & a(m-2,m-1) \end{bmatrix}$$

where $$a(I,J) = \frac{\sum_{i=0}^{n-1} h(I,i)h(J,i) - \left(\sum_{i=0}^{n-1} h(I,i)\right)\left(\sum_{i=0}^{n-1} h(J,i)\right)/n}{\left[\left(\left(\sum_{i=0}^{n-1} h(J,I)^2 - \left(\sum_{i=0}^{n-1} h(J,i)\right)^2\right)/n\right)\left(\sum_{i=0}^{n-1} h(I,i)^2 - \left(\sum_{i=0}^{n-1} h(I,i)\right)^2\right)/n\right]1/2} \qquad \text{Eq. 4}$$

Transformation Matrix 2     Eq. 5

$$T2 = \begin{bmatrix} b(0,1) & b(0,2) & b(0,3) & & b(0,n-1) \\ 0 & b(1,2) & b(1,3) & & b(1,n-1) \\ 0 & 0 & b(2,3) & & b(2,n-1) \\ \vdots & & & \ddots & \vdots \\ 0 & & \cdots & & b(n-2,n-1) \end{bmatrix}$$

where $$b(I,J) = \frac{\sum_{i=0}^{m-1} h(i,I)h(i,J) - \left(\sum_{i=0}^{m-1} h(i,I)\right)\left(\sum_{i=0}^{m-1} h(i,J)\right)/m}{\left[\left(\left(\sum_{i=0}^{m-1} h(i,J)^2 - \left(\sum_{i=0}^{m-1} h(i,J)\right)^2\right)/m\right)\left(\sum_{i=0}^{m-1} h(i,I)^2 - \left(\sum_{i=0}^{m-1} h(i,I)\right)^2\right)/m\right]1/2} \qquad \text{Eq. 6}$$

Transformation Matrix 3

$$T3 = [p_1, p_2, p_3, \ldots p_{m-1}], \text{ where } p_k = \max h(k,i)^2 \ \forall i \qquad \text{Eq. 7}$$

Transformation Matrix 4

$$T4 = [\mu_0, \mu_1, \mu_2, \ldots \mu_{m-1}], \text{ where } \mu_k = \text{mean } h(k,i)^2 \forall i \qquad \text{Eq. 8}$$

Transformation Matrix 5

$$T5 = \begin{bmatrix} d(0,0) & d(1,0) & d(2,0) & \ldots & d(m-1,0) \\ d(0,1) & & & & \\ d(0,2) & & \ddots & & \vdots \\ \vdots & & & & \\ d(0,n-1) & \ldots & & & d(m-1,n-1) \end{bmatrix} \quad \text{Eq. 9}$$

where $d(I,J)=+1$, $h(I,J)^2 > c*P_{max}$ $d(I,J)=0$, otherwise

Transformation Matrix 6

$$T6=[\mu_0, \mu_1, \mu_2, \ldots \mu_{m-1}], \text{ where } \mu_k = \text{mean } d(k,n) \forall n \quad \text{Eq. 10}$$

Transformation Matrix 7

In addition to the transformation matrices set out above, computationally efficient signal mapping methods can be used in accordance with the present invention to generate unique stationary patterns in order to supplement classification, while eliminating carrier frequency offset errors. Since the exact carrier frequency is undetermined before the mapping procedure, a balanced multiplication is used in order to cancel the carrier components. Representing the input in-phase and quadrature signal samples as x(i) and y(i), and the transformation in-phase and quadrature samples as px(i) and py(i), the transformation is as follows:

$$px(j)=y(i+\tau)[y(i)-x(i)]+x(i+\tau)[x(i)+y(i)] \quad \text{Eq. 11}$$

$$py(j)=x(i+\tau)[x(i)-y(i)]+y(i+\tau)[x(i)+x(i)] \quad \text{Eq. 12}$$

where:

$\tau$=delay, in samples i=1 to N j=1 to N-$\tau$

For PSK signal formats, the desired delay $\tau$ is equal to the bit period. By up-sampling to achieve a 10-to-1 oversampling, a close approximation to the desired delay can be obtained. Projection of the histogrammed polar space defined by the above transformation to a Cartesian space S gives the following transformation matrix which defines the unique signal signature, where L and Q are arbitrary integer constants corresponding to magnitude (L) and phase (Q) dimensions:

$$T7 = \begin{bmatrix} S(0,0) & S(1,0) & S(2,0) & \ldots & S(Q-1,0) \\ S(0,1) & & & & \\ S(0,2) & & \ddots & & \\ \vdots & & & & \\ S(0,L-1) & \ldots & & & S(Q-1,L-1) \end{bmatrix} \quad \text{Eq. 13}$$

Figure 8:
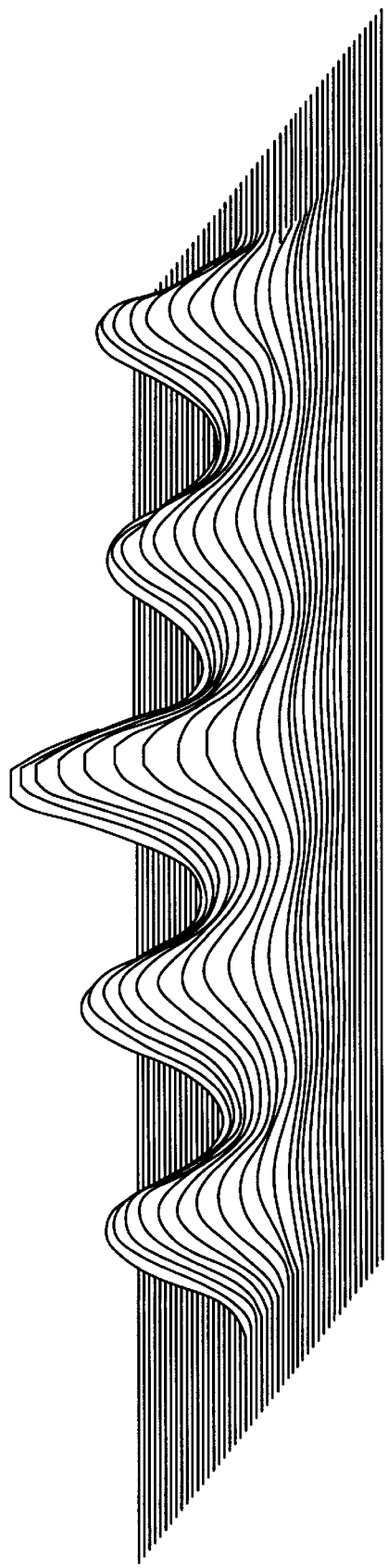
FIG. 8 is a three dimensional view of a signal signature for a communication signal using five-ary frequency shift keying (FSK) in accordance with one embodiment of the present invention.

An example of such a signal signature is shown in FIG. 8 for a communication signal using five-ary frequency shift keying (FSK). T7 projections provide additional feature transformation data, as shown in Equations 14 and 15 below.

Transformation Matrix 8

$$T8=[\mu_0, \mu_1, \mu_2, \ldots \mu_{Q-1}], \text{ where } \mu_k = \text{mean } S(k,l) \forall l \quad \text{Eq. 14}$$

Transformation Matrix 9

$$T9=[\mu_0, \mu_1, \mu_2, \ldots \mu_{L-1}], \text{ where } \mu_k = \text{mean } S(q,k) \forall q \quad \text{Eq. 15}$$

For FSK signal formats, the desired delay $\tau$ is not necessarily equal to the bit period. The pattern is not stationary as in the PSK case where the pattern peaks remain relatively fixed in the phase coordinate dimension. The changing characteristic of the pattern structure for FSK formats can be used to distinguish signal formats that have phase slopes versus fixed phase states during the bit periods. This characteristic is made part of the signal descriptive vector and used to identify FSK formats. For pattern structures that change, phase derivative processing is used to derive a second signal pattern.

In order to obtain the optimum delay for a PSK signal, a baud rate estimate is employed. A delay of approximately one half bit, as estimated by the pre-filter process spectrum width determination, is used. The actual baud rate is determined by performing a spectrum analysis of the transform output. From this baud rate, the proper one bit delay time can be determined. Methods for baud rate calculation are discussed below.

It should be appreciated that the features extracted in the feature extraction unit 25 are not limited to those identified above. In addition, any of the listed parameters or transformations may also be used independently or in concert as input features. In general, the features determined by the feature extraction unit 25 can include any quality of the receive signal that can be used to distinguish one signal class from another.

The non-linear signal classifier 26 receives the features and transformations determined in the feature extraction unit 25 and uses them to classify the received signal. As part of the classification process, the nonlinear signal classifier 26 compares features extracted from the received signal with information of known signal classes that is stored in a memory. The non-linear signal classifier 26 outputs a signal that is indicative of the classification of the receive signal.

Figure 9:
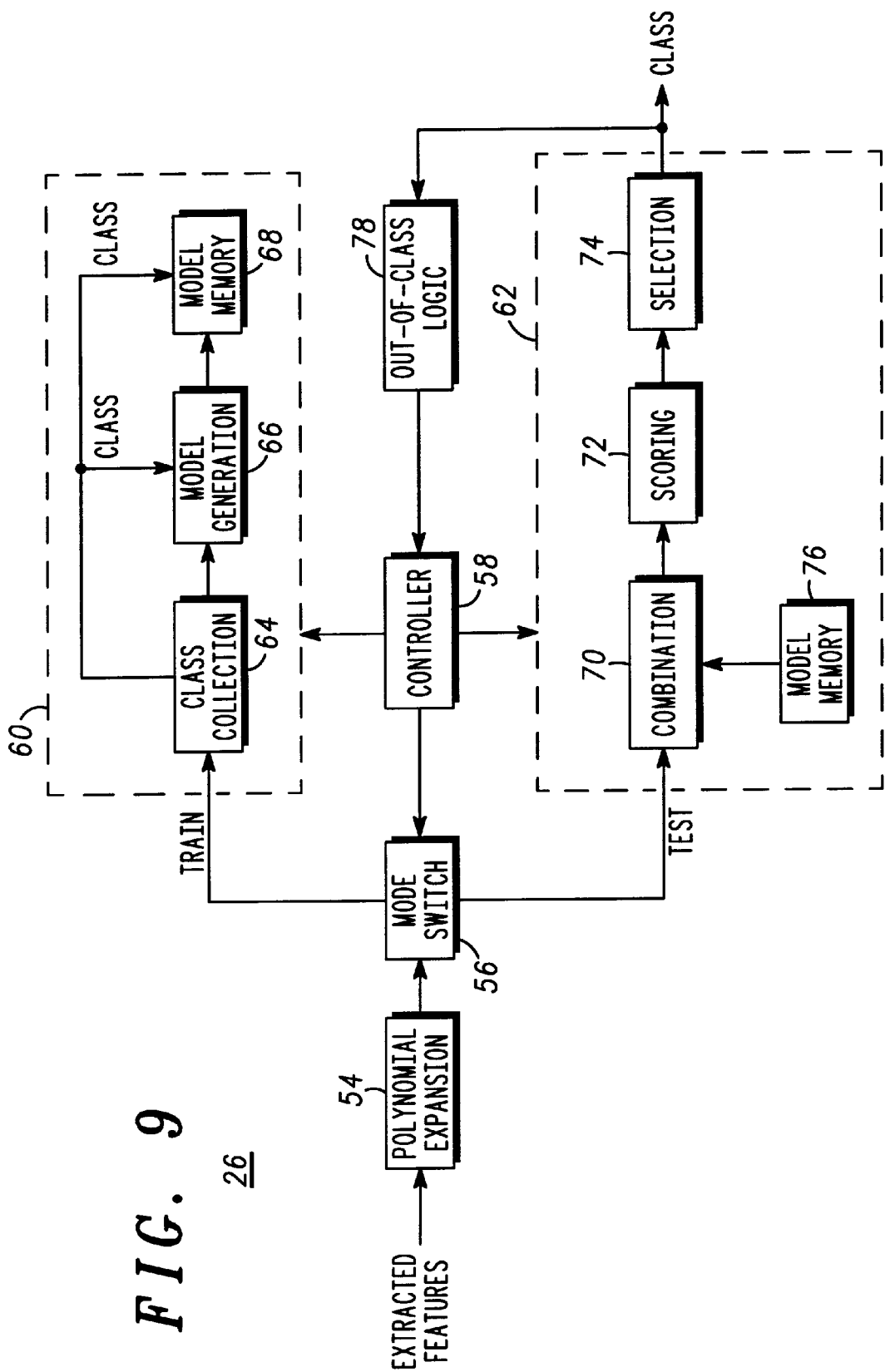
FIG. 9 is a block diagram illustrating the non-linear signal classifier of FIG. 1 in one embodiment of the present invention.

FIG. 9 is a block diagram illustrating a non-linear signal classifier 26 in accordance with one embodiment of the present invention. As illustrated, the non-linear signal classifier 26 includes: a polynomial expansion unit 54, a mode switch 56, a controller 58, training equipment 60, testing equipment 62, and out-of-class logic 78. The non-linear signal classifier 26 has two operating modes: the training mode and the testing mode. During the training mode, the non-linear signal classifier 26 is taught to recognize signal classes that it could not previously recognize. During the testing mode, the non-linear signal classifier 26 analyzes input signals to determine which signal class they belong to. The controller 58 is operative for controlling the operation of, among other things, the mode switch 56, the training equipment 60, and the testing equipment 62. During the training mode, for example, when a new signal class is detected, the controller 58 enables the training equipment 60 and instructs the mode switch 56 to direct input information thereto. Similarly, during the testing mode, the controller 58 enables the testing equipment 62 and instructs the mode switch 56 to direct input information thereto. In one embodiment, the controller 58 is part of the overall receiver controller (not shown).

The polynomial expansion unit 54 is operative for performing a polynomial expansion on the features received from the feature extraction unit 25. In one embodiment of the invention, the feature set X output by the feature extraction unit 25 is represented in matrix form as follows:

$$X = \begin{bmatrix} \langle x_1 \rangle \\ \langle x_2 \rangle \\ \langle x_3 \rangle \\ \vdots \\ \langle x_S \rangle \end{bmatrix} \quad \text{Eq. 16}$$

where $\langle x_1 \rangle$, $\langle x_2 \rangle$, $\langle x_3 \rangle$, ..., $\langle x_S \rangle$ are each vectors corresponding to a particular feature of the received signal. The polynomial expansion unit 54 expands each of the vectors using a polynomial expansion algorithm, to create at least one expanded feature set p(X). In one embodiment of the invention, the polynomial expansion of a vector $\langle x_i \rangle$ is a vector having as components thereof all of the components of the original vector $\langle x_i \rangle$ in addition to all of the possible cross products between components of the original vector $\langle x_i \rangle$, up to a desired order. For example, if the vector $\langle x_i \rangle$ includes three components {a, b, c}, a second order expansion of the vector $\langle x_i \rangle$ would include components {1, a, b, c, ab, ac, bc, $a^2$, $b^2$, $c^2$}, a third order expansion of the vector $\langle x_1 \rangle$ would include components {1, a, b, c, ab, ac, bc, $a^2$, $b^2$, $c^2$, $a^2b$, $a^2c$, $ab^2$, $b^2c$, $ac^2$, $bc^2$, abc, $a^3$, $b^3$, and $c^3$}, and so on. The polynomial expansion unit 54 may create expanded feature sets of more than one order (e.g., both second order and fourth order) for each feature set in accordance with the present invention. The particular orders generated are generally user defined.

The training equipment 60 is operative for training the non-linear classifier 26 to recognize new signal classes. This is done (e.g., during the training mode or when new classes are detected) by generating classification models for the new signal classes. The training equipment 60 includes: a class collection unit 64, a model generation unit 66, and a model memory 68. During the training mode, a signal having an identified signal class is input into the receiver 18. A model corresponding to the identified signal class is then generated in the model generation unit 66 for the signal class and stored in the model memory 68. In one embodiment of the invention, special signal generation equipment (not shown) is used to generate a signal having the desired signal class. The signal generation equipment is connected to the input of the receiver 18 during the training mode. In another embodiment, a training signal having the desired signal class is transmitted to the receiver 18 via the channel 16 during the training mode. This approach can be utilized during actual system operation in the field. In yet another embodiment, training (and/or testing) is performed remotely relative to communication system 10. Model memory 68 is then modified via direct external access (not shown) through a wireless or wired link.

The class collection unit 64 is operative for acquiring the known signal class information for the received signal during the training mode. In addition, the class collection unit 64 can include a memory for storing expanded feature sets for one or more received signals for eventual use by the model generation unit 66. The class collection unit 64 delivers each expanded feature set and the associated class information to the model generation unit 66 which generates a unique signal classification model for the associated signal class. The signal classification model is then stored in the model memory 68 association with the corresponding signal class.

As described above, the model generation unit 66 is operative for generating the signal classification models that are used to classify receive signals in the receiver 18. In accordance with the present invention, a polynomial based classifier is provided for use in recognition applications. The technique can be best described as a multidimensional polynomial fitting (although it can also be thought of as a neural network architecture). Given a set of m $n^{th}$ dimensional training feature vectors X and their corresponding classes c such as:

$$X = \begin{bmatrix} x_1 \\ x_2 \\ \vdots \\ x_i \\ \vdots \\ x_m \end{bmatrix} = \begin{bmatrix} x_{1,1} & x_{1,2} & \cdots & x_{1,n} \\ x_{2,1} & x_{2,2} & \cdots & x_{2,n} \\ \vdots & \vdots & \ddots & \vdots \\ x_{i,1} & x_{i,2} & \cdots & x_{i,n} \\ \vdots & \vdots & \ddots & \vdots \\ x_{m,1} & x_{m,2} & \cdots & x_{m,n} \end{bmatrix}, \text{ and } c = \begin{bmatrix} c_1 \\ c_2 \\ \vdots \\ c_i \\ \vdots \\ c_m \end{bmatrix} \quad \text{Eq. 17}$$

a $p^{th}$ order $n^{th}$ dimensional polynomial f(x) can be constructed to represent this training data, and to be used as a classifier to determine the class of feature vectors of unknown class (test vectors). It should be appreciated that although each $x_j$ is represented as a single vector in Eq. 17, each $x_j$ will be a matrix if more than one feature vector exists for each class. Operating on a vector $x_j$; f(x) can be expressed as follows:

$$f(x_j) = w_0 + w_1 x_{j,1} + w_2 x_{j,2} + \ldots + w_n x_n$$
$$+ w_{n+1} x_{j,1}^2 + w_{n+2} x_{j,2}^2 + \ldots + w_{2n} x_{j,n}^2$$
$$+ w_{2n+1} x_{j,1} x_{j,2} + \ldots + w_r x_{j,n-1} x_{j,n} + \ldots +$$
$$w_{s+1} x_{j,1}^p + w_{s+2} x_{j,2}^p + \ldots + w_{s+n} x_{j,n}^p \ldots + w_r x_{j,1} x_{j,2} \ldots x_{j,p} \quad \text{Eq. 18}$$

It can also be expressed in a more compact way which can be related to the neuron concept. This form can be expressed as:

$$f(x_j) = \sum_{i=1}^{t} w_i \prod_{k=1}^{n} x_{j,k}^{g_k} \quad \text{Eq. 19}$$

where t is the number of terms (neurons), $g_k$ is an integer, and $$\sum_{k=1}^{n} g_k \leq p.$$

The coefficients of f(x), $w_i$(i=1, 2 ... t), can be obtained by solving a set of linear equations that can be obtained from f(x)=c, where:

$$f(X) = \begin{bmatrix} f(x_1) \\ f(x_2) \\ \vdots \\ f(x_i) \\ \vdots \\ f(x_m) \end{bmatrix} \quad \text{Eq. 20}$$

The resulting set of linear equations can be compactly expressed as:

$$\prod \cdot w = c; \text{ or} \quad \text{Eq. 21}$$

-continued $$\begin{bmatrix} \prod_{k=1}^{n} x_{1,k}^{g_k} \\ \prod_{k=1}^{n} x_{2,k}^{g_k} \\ \vdots \\ \prod_{k=1}^{n} x_{i,k}^{g_k} \\ \vdots \\ \prod_{k=1}^{n} x_{m,k}^{g_k} \end{bmatrix} \cdot \begin{bmatrix} w_1 \\ w_2 \\ \vdots \\ w_t \end{bmatrix} = \begin{bmatrix} c_1 \\ c_2 \\ \vdots \\ c_i \\ \vdots \\ c_m \end{bmatrix} \qquad \text{Eq. 22}$$

Once the coefficients, w, are determined, the class of any given test vector $x_k$ can be determined by computing $f(x_k)$. The entire training procedure thus reduces to a matrix inverting (or pseudo inverting) problem. Therefore, attention needs to be paid to the rank and the condition number of the matrix $\pi$. If we define $\pi$ as P, where P can equivalently be represented by the $q^{th}$ order polynomial basis expansion of the feature vectors in X, then Eq. 21 can be written as:

$$P^t P w = P^t c \qquad \text{Eq. 23}$$

A unique mapping exists which represents all of the unique elements in $P^t P$, we represent as p. Each class model can then be found by inverting matrix $P^t P$ and solving for w. p is found through a $2*q^{th}$ order polynomial basis expansion of the feature vectors in X, and from which the unique mapping between p and $P^t P$ is then given. The use of p then supports new class addition and reinforcement of any currently existing classes.

A method will now be described for use in the model generation unit 66 for creating signal classification models for a set of signal classes in accordance with one embodiment of the present invention. In the discussion that follows, the term "signal class set" includes all signal classes for which the non-linear classifier is to be trained, i is a signal class index for a particular class in the signal class set, j is an index for the feature vectors in the feature set $X_i$ for a particular class, S is the total number of vectors in the feature set $X_i$, $p(X_i)$ is a second order polynomial expansion vector of the feature set $X_i$, and $p(X_i)$ is the fourth polynomial expansion vector of the feature set $X_i$, In one embodiment of the present invention, the expanded feature sets (i.e., $p(X_i)$ and $p_2(X_i)$) for each class in the signal class set will be stored in the class collection unit 64 prior to processing in the model generation unit 66.

A high order correlation vector $<r_i>$ and a low order average vector $<a_i>$ are first calculated for each signal class in the signal class set. The high order correlation vector $<r_i>$ for the $i_{th}$ signal class is calculated by finding the sum of the fourth order polynomial expansion vectors for all of the feature vectors in the feature set $X_i$ of the ith signal class. For example, if the feature set $X_4$ includes three feature vectors, the high order correlation vector $<r_4>$ will be equal to the sum of the fourth order polynomial expansions of the three feature vectors (and will have the same length as the fourth order polynomial expansion vectors). Likewise, the low order average vector $<a_i>$ for the ith signal class is calculated by finding the sum of the second order polynomial expansion vectors for all of the feature vectors in the feature set $X_i$ of the ith signal class.

Next, a high order correlation sum vector $<r>$ is calculated by adding together the high order correlation vectors $<r_i>$ for all of the signal classes in the signal class set. That is:

$$\langle r \rangle = \sum_{i=1}^{N} \langle r_i \rangle$$

A scaled high order correlation vector $<r_i'>$ is then generated for each signal class using the following equation:

$$<r_i'>=<r>+((N_{all}/N_i)-2)<r_i>$$

where $N_i$ is the number of feature vectors in the $i_{th}$ signal class, $N_{all}$ is the number of feature vectors for all classes in the feature class set, and $N_{all}/N_i$ is the scaling factor. The scaled high order correlation vector $<r_i'>$ is next mapped into a correlation matrix $R_i'$. This mapping operation can be described by the operation $p(X)p(X)^t$ where the t represents the transpose of the associated vector.

The correlation matrix $R_i'$ is next decomposed for each signal class in the signal class set. In the preferred embodiment of the invention, Cholesky decomposition is used to produce upper triangular matrix $L_i$. As is well known in the art, Cholesky decomposition is based upon the following equation:

$$L_i^t L_i = R_i'$$

Although Cholesky decomposition is illustrated, other methods known to those of skill in the art, may also be used (e.g., Gaussion elimination). After the correlation matrix has been decomposed, a signal classification model is calculated for each signal class in the signal class set. To calculate the signal classification model $<W_i>$, the following equation is solved:

$$L_i^t L_i <W_i> = ((N_{all}/N_i)-1)<a_i>$$

As is well known in the art, the above equation can be solved using, for example, back substitution.

Advantageously, the above-described techniques allow new signal classes to be added to the non-linear signal classifier 26 without having to re-train the system for all of the previously added signal classes. This reduces the level of computation required to add new classes and, accordingly, reduces the amount of time required to add new classes. In addition, the techniques can be used to update models for previously added signal classes. Furthermore, as will be described in greater detail, the signal classification models generated by the above-described techniques allow a relatively simple classification procedure to be used during the testing mode.

After a signal classification model has been developed for a signal class, the model is stored in the model memory 68 in association with signal classification information. The signal classification information can identify the name of the signal class associated with the model and/or it can include information on how to process a signal of that particular signal class for optimal signal recovery. Other types of signal class information are also possible. In a preferred embodiment, the signal classification models are vectors having a predetermined number of components.

It should be appreciated that the non-linear signal classifier 26 of the present invention does not have to include a training mode. That is, training of the classifier 26 can be performed during manufacture, in which case much of the training functionality can be located within a separate training unit (not shown) external to the non-linear signal classifier 26. However, the inclusion of training equipment within the non-linear signal classifier 26 facilitates the addition of new signal classifications in the field. Alternatively, new or updated models can be transferred from a remote site to the receiver testing unit via wireline and/or wireless connection.

With reference to FIG. 9, as described above, the testing equipment 62 is used to classify signals received from a channel using the models generated by the training equipment 60. As illustrated, the testing equipment 62 includes: a combination unit 70, a scoring unit 72, a selection unit 74, and a model memory 76. The model memory 76 can be the same or a different unit from model memory 68 in the training equipment 60. For example, in situations where the training equipment 60 is located remotely from the testing equipment 62, separate model memories are used. In such a situation, signal classification models are simply transferred between the memories using appropriate transfer means.

During the testing mode, the combination unit 70 receives an expanded feature set p(X) for the received signal from the polynomial expansion unit 54 and combines the expanded feature set with each of the signal classification models in the model memory 76. The combination unit 70 then outputs a set of combination values to the scoring unit 72 for each of the signal classification models in the model memory 76. In a preferred embodiment, the combination unit 70 determines a vector dot product between each of the expanded feature vectors in the expanded feature set for the received signal and each of the signal classification models (which, in the preferred embodiment, are vectors). For example, if the expanded feature set p(X) for the received signal is:

$$p(X) = \begin{bmatrix} \langle x_1^p \rangle \\ \langle x_2^p \rangle \\ \langle x_3^p \rangle \\ \vdots \\ \langle x_S^p \rangle \end{bmatrix} \qquad \text{Eq. 21}$$

where $\langle x_1^p \rangle$, $\langle x_2^p \rangle$, $\langle x_3^p \rangle$, . . . $\langle x_s^p \rangle$ are expanded feature vectors in the expanded feature set p(X), and each expanded feature vector is represented as follows:

$$\langle x_1^p \rangle = [a_{x1} b_{x1} c_{x1} \ldots L_{x1}]$$
$$\langle x_2^p \rangle = [a_{x2} b_{x2} c_{x2} \ldots L_{x2}]$$
$$\langle x_3^p \rangle = [a_{x3} b_{x3} c_{x3} \ldots L_{x3}] \qquad \text{Eq. 22}$$
$$\langle x_s^p \rangle = [a_{xs} b_{xs} c_{xs} \ldots L_{xs}]$$

where $a_{x1}$, $b_{x1}$, $c_{x1}$, . . . $Lx_1$, etc. are the components (which are constants) of the expanded feature vectors, and the first signal classification model $M_1$ stored in the model memory 76 is represented as:

$$M_1 = \begin{bmatrix} C_1 \\ C_2 \\ C_3 \\ \vdots \\ C_L \end{bmatrix} \qquad \text{Eq. 23}$$

where $C_1$, $C_2$, $C_3$, . . . $C_L$ are constants, then the vector dot products will result in S constant values $y_1$ through $y_s$ where:

$$y_1 = \langle x_1^p \rangle \cdot M_1 = a_{x1} C_1 + b_{x1} C_2 + c_{x1} C_3 + \ldots + L_{x1} C_L$$
$$y_2 = \langle x_2^p \rangle \cdot M_1 = a_{x2} C_1 + b_{x2} C_2 + c_{x2} C_3 + \ldots + L_{x2} C_L$$
$$y_3 = \langle x_3^p \rangle \cdot M_1 = a_{x3} C_1 + b_{x3} C_2 + c_{x3} C_3 + \ldots + L_{x3} C_L \qquad \text{Eq. 24}$$
$$y_s = \langle x_s^p \rangle \cdot M_1 = a_{xs} C_1 + b_{xs} C_2 + c_{xs} C_3 + \ldots + L_{xs} C_L$$

These constant values form the components of a vector $\langle y_1 \rangle$ corresponding to the first signal classification model $M_1$. Similar vectors are produced for all of the other models in the model memory 76.

After the expanded feature set has been combined with all of the models in the model memory 76, the resulting vectors are transferred to the scoring unit 72 to create scores for each of signal classification models. In a preferred embodiment of the present invention, scores are created by finding averages for each of the vectors $\langle Y_i \rangle$ determined in the combination unit 70. That is, the components of each vector $\langle Y_i \rangle$ are added together and then divided by the total number of components within the vector. The output of the scoring unit 72 is comprised of a vector $\langle A \rangle$ having as components the score values (such as, e.g., the vector averages) for each of the signal classification models.

The selection unit 74 analyzes the vector $\langle A \rangle$ to determine which of the signal classification models (i.e., which signal class) most likely corresponds to the received signal. In a preferred embodiment, the selection unit 74 simply compares the elements of the vector $\langle A \rangle$ to determine the maximum vector average produced by the scoring unit 72 and outputs the associated signal class. In another embodiment of the invention, the selection unit 74 outputs more than one signal class for the received signal and also outputs probabilities that each of the identified signal classes represent the received signal. The functionality using the signal class information (e.g., signal processing unit 28 of FIG. 1) can then determine on its own whether it wants to rely on the classification determination of the non-linear signal classifier 26. If the probability associated with one class is much higher than those associated with other classes, the functionality will likely decide to rely on the information.

The out-of-class logic (OCL) 78 monitors the output of the testing equipment 62 to determine when a signal having a new signal class (i.e., a signal class that the classifier does not recognize) has been received. When a new class has been detected, the OCL 78 determines whether there is a need to update the existing models to include the new class. If such a need exists, the OCL 78 instructs the controller 58 to perform the update.

The non-linear signal classifier 26 described above can be expanded to identify characteristics of a received signal in addition to (or alternative to) signal class. For example, the non-linear signal classifier 26 can be modified to identify characteristics such as the signal-to-noise ratio (SNR) of the received signal, the type of interference corrupting the received signal, and/or the type of channel (e.g., Rician, Rayleigh, Rummler, etc.) delivering the received signal to the receiver 18. To identify SNR in addition to signal class, for example, multiple signal models need to be generated in the model generation unit 66 for each of the signal classes. That is, for each signal class, a model must be generated for each of a number of discrete SNR values. The models can then be stored in the model memory 68 as a model matrix where, for example, the columns of the matrix each correspond to a specific signal class and the rows of the matrix each correspond to a particular SNR value. Processing in the testing equipment 62 then proceeds as usual, except for the fact that the number of signal classification models has increased by a factor equal to the number of SNRs trained.

The concept can be further extended by creating additional model matrices for different values of a third characteristic, such as channel type, to form a matrix group.

Additional matrix groups can then be generated to add another characteristic, such as jammer type, to the non-linear signal classifier 26, and so on. Each of the individual models in the model memory corresponds to a particular signal "type" including a particular designation for each of the corresponding signal characteristics. For example, a particular signal classification model may correspond to a signal "type" comprising five tone frequency shift keying (FSK) with an SNR of 5 dB delivered through a Rician channel. All previous discussion of the invention using the term "signal class" can be extended for use with the broader term "signal type".

Figure 10:
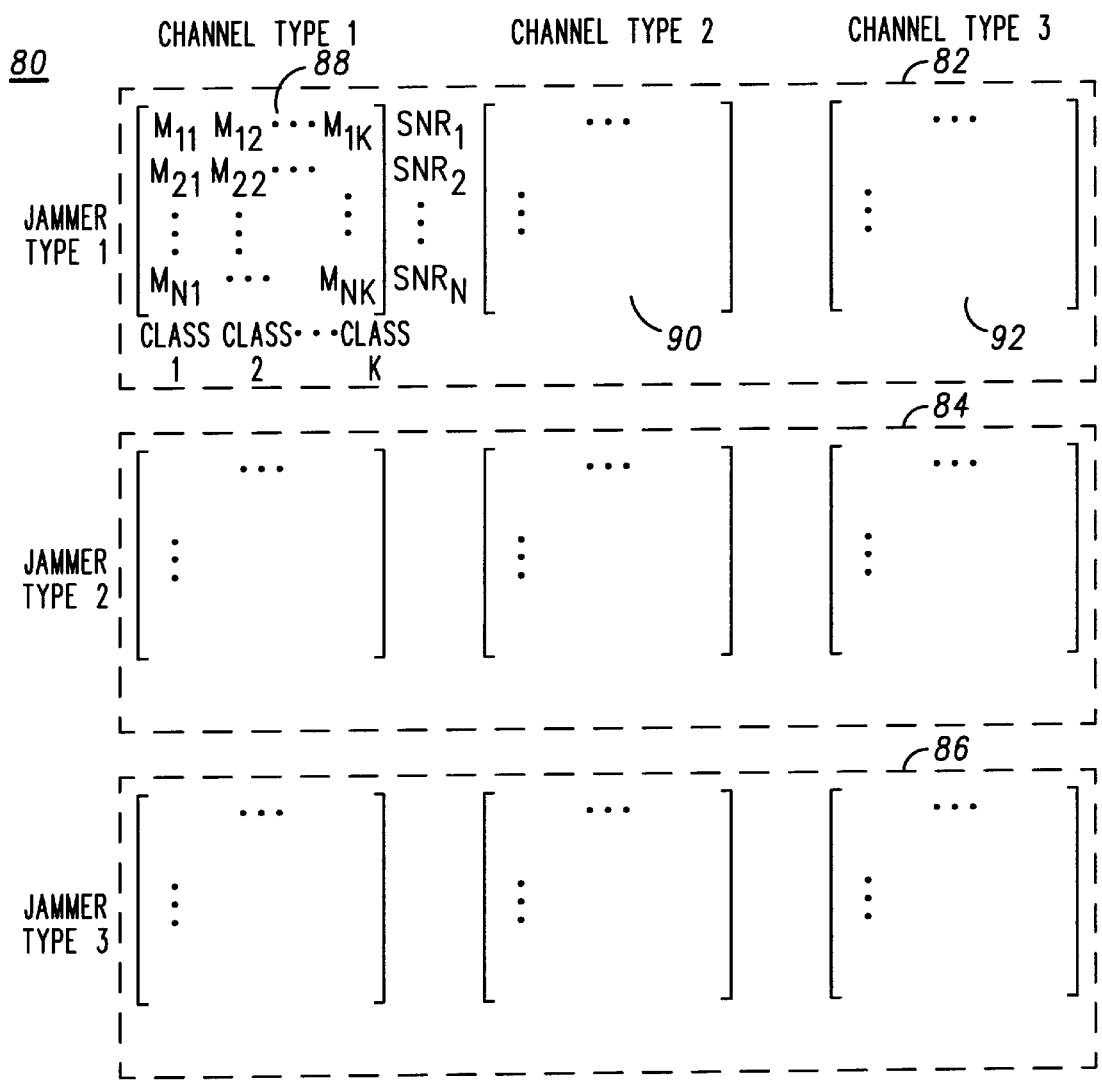
FIG. 10 is a diagram illustrating a memory structure for storing signal classification models in one embodiment of the present invention.

FIG. 10 is a diagram of a memory structure 80 for storing models $M_{ij}$ for four different signal characteristics (i.e., signal class, SNR, channel type, and jammer type). The memory structure 80 includes a plurality of matrix groups 82, 84, 86, each corresponding to a particular jammer type. Each of the matrix groups 82, 84, 86 includes a plurality of matrices that each correspond to a different channel type (e.g., matrix group 82 includes matrix 88 corresponding to channel type 1, matrix 90 corresponding to channel type 2, and matrix 92 corresponding to channel type 3, and so on). Each matrix includes a plurality of columns each corresponding to a particular signal class and a plurality of rows each corresponding to a particular SNR. The testing equipment 62 can use the memory structure 80 in the same way that it used the individual signal classification models described above. That is, combinations can be made for models in the memory structure 80, scoring can be performed, and one or more signal types (with corresponding probabilities) can be selected. In addition, if any information about the received signal is known beforehand, such as the channel type, the testing can be limited to only relevant portions of the memory structure 80.

In addition to the memory structure 80 of FIG. 10, the model memory 68 can also include a group of signal classification models that are only used to determine the jammer type of the signal. That is, each of the models in the group will correspond to a particular jammer type. Combinations are first made with the models in this group to determine the jammer type of the signal. Once jammer type has been determined, combinations are then performed for all of the models within the appropriate matrix group 82,84,86 to determine signal type. That is, multi-resolutional signal classification is performed. In an extension of this technique, instead of using matrix groups 82,84,86, a set of models that each correspond to a different channel type can be provided for each jammer type. Therefore, once jammer type has been identified, the signal is then tested using the appropriate set of channel type models, and so on. This multi-resolutional approach can significantly reduce the complexity of the models. However, the approach may require multiple feature extraction/combination/selection steps during testing.

Referring back to FIG. 1, after the non-linear signal classifier 26 has determined the signal-class (or signal-type) of the received signal, it delivers classification information to the signal processing unit 28. The signal processing unit 28 also receives a copy of the received signal from the output of the signal preconditioning unit 24 or, alternatively, from the output of the signal receptor 23. A signal memory (not shown) may be provided to store the received signal to compensate for processing time in the non-linear signal classifier 26. The signal processing unit 28 then processes the received signal in accordance with the classification information from the non-linear signal classifier 26.

FIGS. 11–16 relate to embodiments of the present invention that are each capable of performing universal software demodulation (USD). That is, each of the embodiments include a receiver that is capable of receiving signals having any one of a large number of different signal types and automatically recovering the baseband information within the signal with no prior knowledge of signal type. The USD embodiments of the invention are useful in any application where a single radio unit is called upon to process signals having different or varying signal formats or waveforms. Where possible, the same reference numerals are used in FIGS. 11–16 that were used previously to describe similar functionality.

Figure 11:
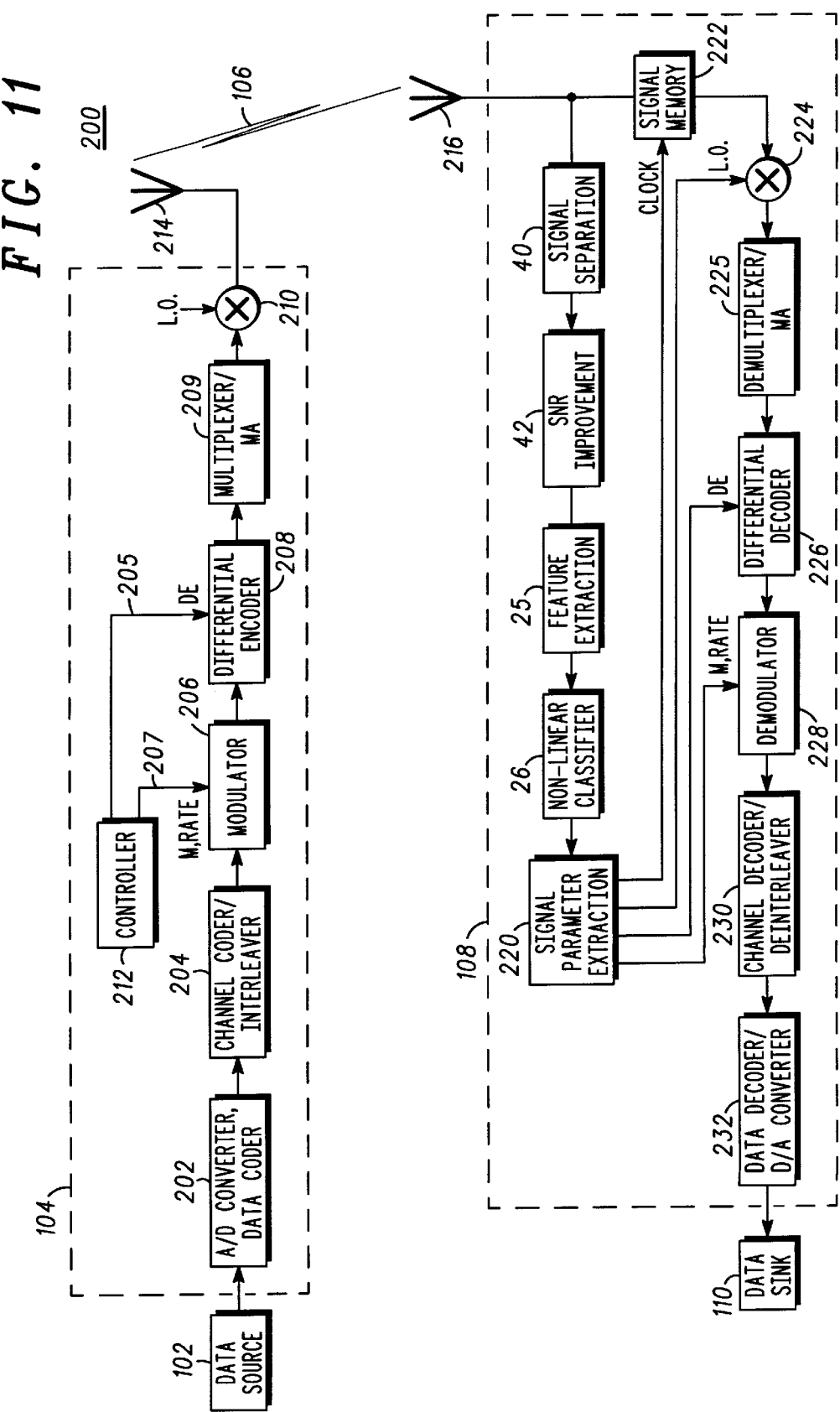
FIG. 11 is a block diagram illustrating a fixed-rate, universal software demodulation (USD) communications system in accordance with one embodiment of the present invention.

FIG. 11 is a block diagram of a fixed-rate, USD communications system 200 in accordance with one embodiment of the present invention. The system 200 includes: a data source 102, a transmitter 104, a channel 106, a receiver 108, and a data sink 110. The transmitter 104 is coupled to an antenna 214 and the receiver 108 is coupled to an antenna 216 for communication with the channel 106. The transmitter 104 includes: an A/D converter/data coder 202, a channel coder/interleaver 204, a modulator 206, a differential encoder 208, a multiplexer/multiple access (MA) unit 209, a mixer 210, and a controller 212. These elements are operative for processing a data signal from the data source 102 for transmission into the channel 106. Because each of these elements is generally well known in the art, they will not be described further except where necessary for describing the invention.

The modulator 206 includes an input 207 for receiving one or more configuration signals (e.g., M and Rate) indicative of a type (M) and rate of modulation (Rate) to be applied to the data signal. Likewise, the differential encoder 208 (which is optional) includes an input 205 for receiving a signal, DE, indicative of a form of differential encoding to be performed on the data signal. The controller 212 is operative for, among other things, delivering input signals to the modulator 206 and the differential encoder 208 to set the encoding/modulation. The controller 212 can determine appropriate settings for the units by various means, such as via an interface (not shown) with a user of the transmitter 104 or via an algorithm stored in an internal memory. The multiplexer/MA unit 209 is operative for performing multiplexing/multiple access techniques in the transmitter 104. The multiplexer/MA unit 209 can perform virtually any method of multiplexing/multiple access in accordance with the present invention, such as orthogonal frequency division multiplexing, time division multiple access, and/or others. After the data from the data source 102 has been encoded, modulated, and multiplexed, the mixer 210 upconverts the signal and delivers it to antenna 214 for transmission into the channel 106.

The receiver 108 receives the transmitted signal from the channel 106 at antenna 216. As described earlier, the received signal will be a modified version of the signal originally transmitted by the transmitter 104 due to the addition of noise in the channel 106 and other channel effects. In accordance with the present invention, the receiver 108 is capable of processing the received signal to recover baseband data within the signal without having prior knowledge of the type of encoding and/or modulation used to generate the signal in the transmitter 104. The receiver 108 includes: a signal separation unit 40, a SNR improvement unit 42, a feature extraction unit 25, a nonlinear classifier 26, a signal parameter extraction unit 220, a signal memory 222, a mixer 224, a demultiplexer/MA unit 225, a differential decoder 226, a demodulation unit 228, a channel decoder 230, and a data decoder/digital-to-analog converter (DAC) 232. The signal separation unit 40, the SNR improvement unit 42, the feature extraction unit 25, and the non-linear classifier 26 are all substantially the same as the corresponding units described previously.

The signal parameter extraction unit 220 receives the signal classification (or signal-type) information from the non-linear classifier 26 and uses the information to extract parameter values for use in processing the receive signal. The signal memory 222 stores the receive signal temporarily until the appropriate parameter values have been recovered by the signal parameter extraction unit 220. Then, the signal parameter extraction unit 220 clocks the receive signal out of the memory 222 to the differential decoder 226 (which is optional), the demodulation unit 228, the channel decoder/deinterleaver 230, and the data decoder/DAC 232 for processing in accordance with the recovered parameter values. The resulting baseband data is delivered to the data sink 110. In an alternate embodiment, the signal memory 222 is located between the mixer 224 and the demultiplexer/MA 225, thereby reducing the amount of memory required. This embodiment can be used in applications where the receiver LO frequency is known before signal reception.

The signal parameter extraction unit 220 determines the specific parameters for which values will be extracted based, in part, on the type of signal being processed. For example, values for a first set of parameters can be extracted if a first receive signal-type is detected and values for a second, different set of parameters can be extracted if a second receive signal-type is detected. As shown in FIG. 11, some of the parameters for which values can be extracted include: local oscillator (LO) frequency for use in performing down-conversion in mixer 224, differential encoding type (DE) for use in performing differential decoding in the differential decoder 226, and modulation type (M) and modulation symbol rate (Rate) for use in performing demodulation in the demodulator 228. Other parameter values may also be recovered in accordance with the present invention. Note that the desired signal is assumed to be present in the receive band with LO fine tuning. Alternate embodiments include wideband scanning functions using efficient polyphase implementations.

Figure 18:
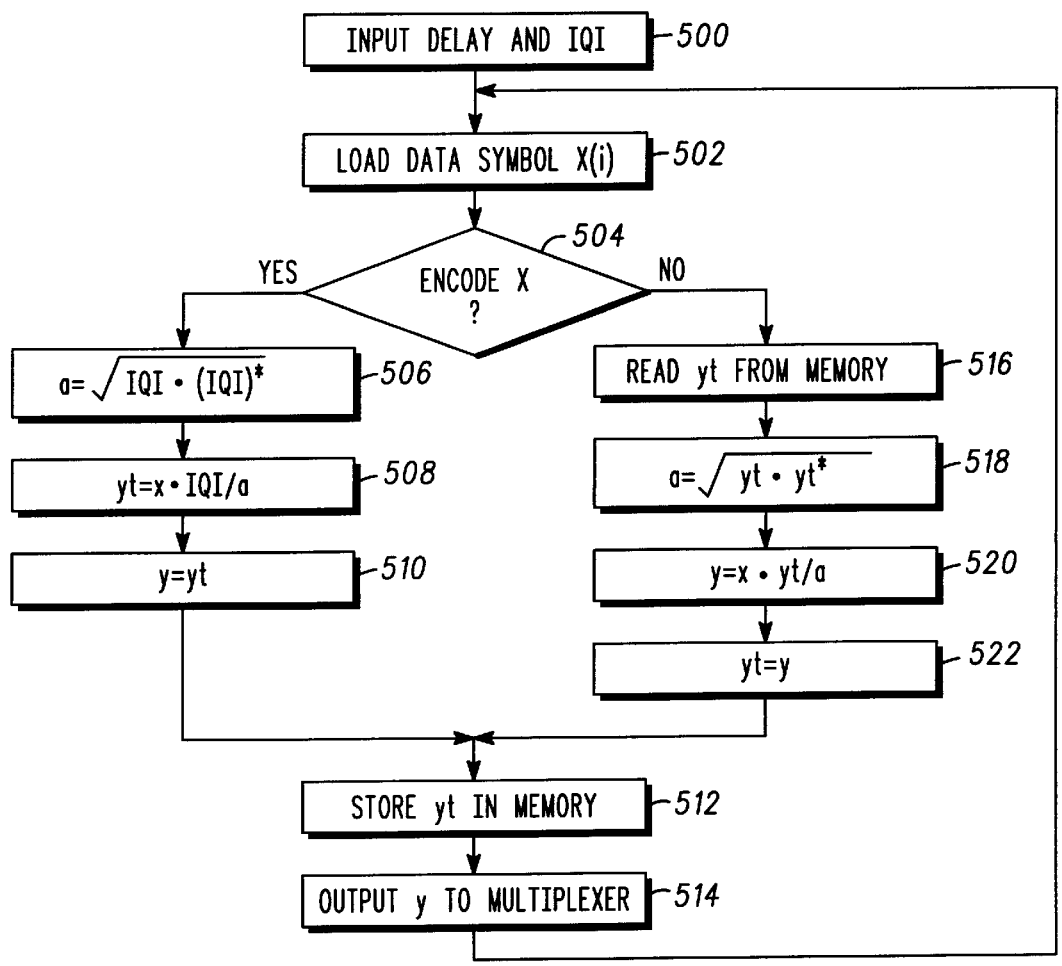
FIG. 18 is a flowchart illustrating a method for performing differential encoding in accordance with the present invention.
Figure 19:
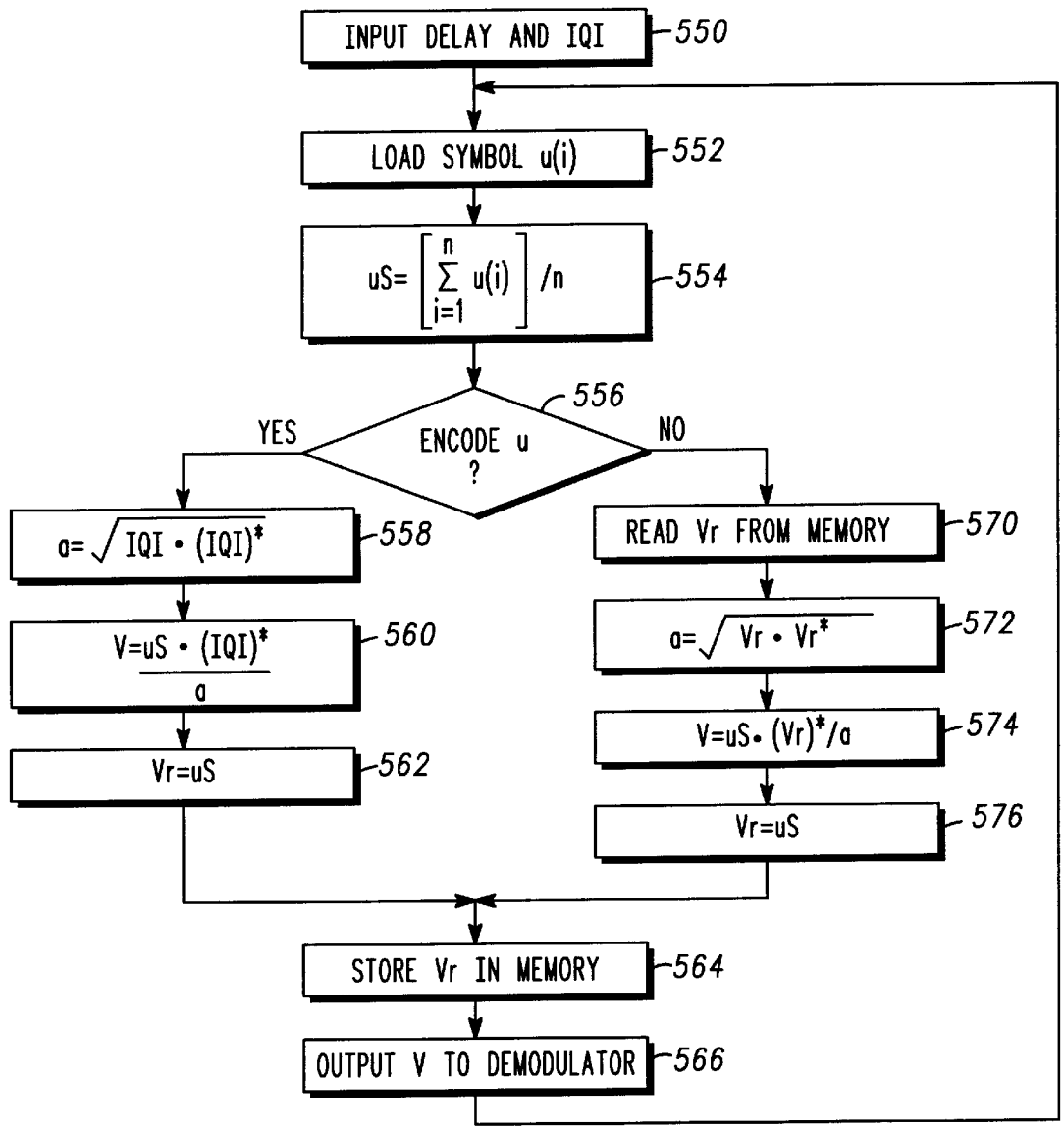
FIG. 19 is a flowchart illustrating a method for performing differential decoding in accordance with the present invention.

FIGS. 18 and 19 are flowcharts illustrating methods for performing universal differential encoding and differential decoding, respectively, in accordance with the present invention. The methods will work for any quadrature input signal and can be modified to work with other input signal types. The methods can be implemented, for example, in the differential encoder 208 and the differential decoder 226 of FIG. 11. With reference to FIG. 18, differential encoding is performed by first inputting parameter values for (i) the number of samples per symbol (Delay) in the data to be encoded and (ii) the initial constellation point (IQI) for the data (step 500). Next, a data symbol x(i) is loaded (step 502). It is then determined whether the data symbol x(i) is to be differentially encoded (step 504). This decision will normally be made by a controller in the transmitter and depends upon system requirements. If the symbol x is to be encoded, a constant, a, is calculated as follows (step 506):

$$a = \sqrt{IQI \cdot (IQI)^*}$$

where (IQI) * is the complex conjugate of IQI. A symbol yt is next calculated as follows (step 508):

$$yt = x \cdot IQI/a.$$

An output symbol, y, is then set equal to the symbol yt (step 510) and yt is stored in a memory (step 512). The output symbol y, which is differentially encoded, is then transferred to the multiplexer 209 (see FIG. 11) (step 514). The process then returns to step 502 where a next symbol is loaded.

If the symbol x is not to be encoded, yt is read from the memory (step 516). A value for constant a is then calculated as follows (step 518):

$$a = \sqrt{yt \cdot (yt)^*}$$

and the symbol y is calculated using the following equation (step 520):

$$y = x \cdot yt/a.$$

The symbol yt is then set equal to y (step 522) and yt is stored in memory (step 512). As before, the symbol y is then delivered to the multiplexer 209 (step 514) and the method is repeated for a new input symbol.

With reference to FIG. 19, differential decoding is performed by first inputting parameter values for (i) the number of samples per symbol (Delay) in the data to be decoded and (ii) the initial constellation point (IQI) for the data (step 550). Next, a data symbol u(i) is loaded (step 552). Then, an average sample value, us, is determined for the symbol u (step 554). It is then determined whether the data symbol u needs to be differentially decoded (step 556). If the symbol u is to be decoded, a constant, a, is calculated as follows (step 553):

$$a = \sqrt{IQI \cdot (IQI)^*}$$

and an output symbol v is calculated as follows (step 560):

$$v = us \cdot (IQI)^*/a.$$

A symbol, vr, is then set equal to the output symbol v (step 562) and is stored in the memory (step 564). The output symbol v, which is differentially decoded, is then transferred to the demodulator 228 (see FIG. 11) (step 566). The process then returns to step 552 where a next symbol is loaded.

If the symbol u is not to be decoded, vr is read from the memory (step 570). A value for constant a is then calculated as follows (step 572):

$$a = \sqrt{vr \cdot (vr)^*}$$

and the symbol v is calculated using the following equation (step 574):

$$v = us \cdot (vr)^*/a.$$

The symbol vr is then set equal to us (step 576) and vr is stored in memory (step 564). The symbol v is then delivered to the demodulator 228 (step 566) and the method is repeated for a new input symbol.

Figure 12:
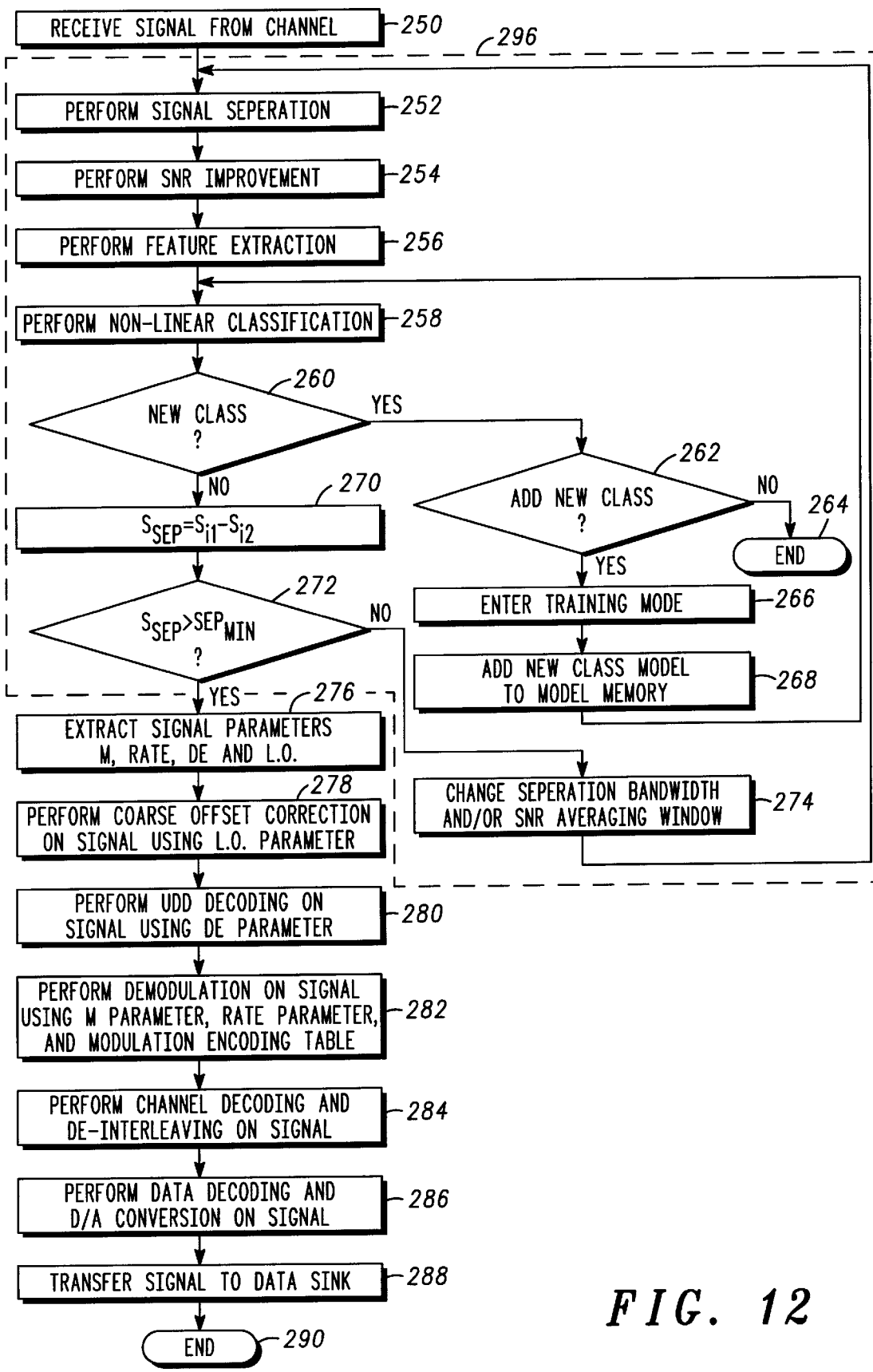
FIG. 12 is a flowchart illustrating a method for processing a fixed rate receive signal in accordance with one embodiment of the present invention.

FIG. 12 is a flowchart illustrating a method for processing a fixed rate receive signal in accordance with one embodiment of the present invention. First, a signal is received from the channel (step 250). Signal separation and SNR improvement are next performed on the signal as described above (steps 252 and 254). Feature extraction and non-linear classification, as described previously, are then performed on the signal (steps 256 and 258). If a signal class is not identified during the non-linear classification step, it is assumed that the receive signal must belong to a new class (i.e., one for which the receiver 108 has not been trained) (step 260). The receiver 108 then determines whether it is to be trained to add the new class (step 262). If the new class is not to be added, the receiver processing is complete (step 264). If the new class is to be added, the training mode is entered (step 266) and a new class model is generated and added to the appropriate model memory (step 268). As described above, in accordance with the present invention, the new signal classification model can be added to the model memory without having to modify the models already stored therein. After the new model has been stored, non-linear classification (step 258) is repeated.

When the non-linear classification step (step 258) identifies a particular signal class for the received signal, it is next determined whether the identified signal class is reliable. In the illustrated embodiment, reliability is measured as the separation between the identified signal class and the next most likely signal class (step 270). If the separation is low (i.e., below a predetermined minimum threshold $SEP_{min}$), the separation bandwidth and/or the SNR averaging window is changed and the entire method is repeated (steps 272 and 274). If the separation is high (i.e., above a predetermined minimum threshold $SEP_{min}$), the identified signal class is deemed accurate and the method continues (step 272). It should be noted that steps 252 through 274 represent a non-linear classification sub-method that will be referred to herein as the universal signal classifier module 296. Additional separation may also be achieved through existing model reinforcement. This is done by retraining the system background and individual correlation model vectors.

After adequate separation has been achieved, values are extracted for the required signal parameters including M, Rate, DE, and LO (step 276). These parameter values are then used to process the signal that has been stored in the signal memory 222. The LO parameter value is used to perform coarse offset correction on the received signal (step 278); the optional DE parameter value is used to perform universal differential decoding (UDD) on the signal (step 280); and the M and Rate parameter values (and a modulation encoding table) are used to demodulate the signal (step 282). Channel decoding, de-interleaving, data decoding, and digital-to-analog conversion are then performed on the signal (steps 284 and 286). Data encoding/decoding may represent speech, image, video compression, etc. The resulting signal is then transferred to the data sink 110 (step 288) and the process is complete (step 290).

Figure 13:
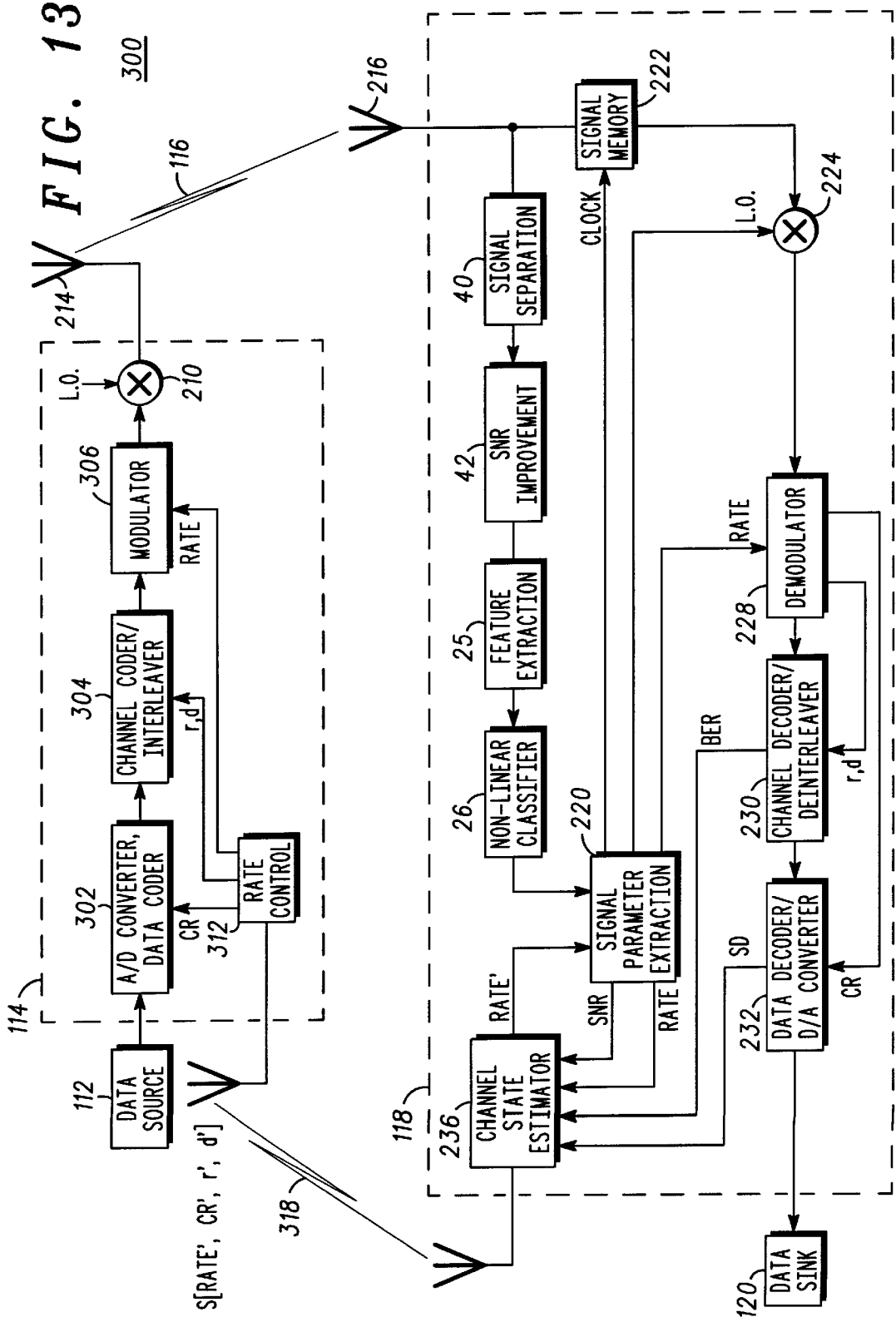
FIG. 13 is a block diagram illustrating an adaptive rate, USD communications system in accordance with one embodiment of the present invention.

FIG. 13 is a block diagram of an adaptive rate, USD communications system 300 in accordance with the present invention. The system 300 includes: a data source 112, a transmitter 114, a channel 116, a receiver 118, and a data sink 120. The system 300 is capable of adaptively modifying the characteristics of a signal transmitted from the transmitter 114 based, in part, on information fed back from the receiver 118. The receiver 118 is capable of processing the signal received from the channel 116 to recover the baseband data despite the fact that the characteristics of the signal are continuously adapting.

The transmitter 114 includes: an A/D converter/data coder 302, a channel coder/interleave unit 304, a modulator 306, a mixer 310, and a rate control unit 312. The A/D converter/data coder 302, the channel coder/interleave unit 304, and the modulator 306 each include an input for receiving configuration information from the rate control unit 312. For example, the A/D converter/data coder 302 receives an input signal, CR, indicating a data coder compression ratio value to be used; the channel coder/interleave unit 304 receives two input signals, r and d, indicating values for channel coding rate and interleaver depth, respectively, to be used; and the modulator 306 receives a signal, Rate, indicating a modulation symbol rate to be used. As will be discussed in greater detail, the rate control unit 312 derives the configuration information from a feedback signal received from the receiver 118 via a feedback channel 318. The feedback signal includes channel state estimation information, S, determined in the receiver 118 based on communication performance values calculated in the receiver 118.

The receiver 118 includes: a signal separation unit 40, a SNR improvement unit 42, a feature extraction unit 25, a non-linear classifier 26, a signal parameter extraction unit 220, a signal memory 222, a mixer 224, a differential decoder 226, a demodulation unit 228, a channel decoder 230, a data decoder/DAC 232, and a channel state estimation unit 236. Except as described in the discussion that follows, most of the above-listed elements perform substantially the same function as described previously.

The demodulation unit 228 receives an input signal, Rate, from the signal parameter extraction unit 220 and uses it to demodulate the downconverted signal from the mixer 224. The demodulation unit 228 also determines values for the r, d, and CR parameters and delivers these values to the channel decoder/de-interleaver 230 and the data decoder/DAC 232, respectively. The channel decoder/de-interleaver 230 uses the r and d parameter values to channel decode and de-interleave, respectively, the received signal. In addition, the channel decoder/de-interleaver 230 generates a bit error rate (BER) value for use by the channel state estimation unit 236. The data decoder/DAC 232 uses the CR parameter value to data decode the received signal. The data decoder/DAC 232 also generates a source distortion (SD) value for use by the channel state estimation unit 236.

The channel state estimation unit 236 is operative for using various performance parameter values received from elements within the receiver 118 to estimate the state of the channel 116. The channel state information generated by the channel state estimation unit 236 can then be used for various purposes. For example, the channel state information can be used to determine whether the parameter values used to process the receive signal in the receiver 118 (i.e., the parameter values generated by the signal parameter extraction unit 220) were accurate. If the parameter values are determined to be inaccurate, processing in the receiver 118 can be repeated with new values.

The channel state information can also be used to determine optimal transmit parameters to be used by the transmitter 114 in light of the condition in the channel 116. The optimal transmit parameters can be generated in the channel state estimation unit 236 and transferred to the transmitter 114 via a feedback channel 318 (as in the illustrated embodiment) or the channel state information can be transferred to the transmitter 114 via the feedback channel 318 and the optimal transmit parameters determined therein. The rate control unit 312 then applies the optimal transmit parameters to the A/D converter/data coder 302, the channel coder/interleaver 304, and the modulator 306 for use in generating future transmit signals. In this manner, the transmit signal transmitted by the transmitter 114 can adapt to changing channel conditions to ensure a high level of communications quality. In the illustrated embodiment, the channel state estimation unit 236 receives input signals indicating the signal-to-noise ratio (SNR), bit error rate (BER), source distortion (SD), and modulation symbol rate (Rate) of communications received through the channel 116. The channel state estimation unit 236 uses these values to determine the state of the channel 116 and estimate values for modulation symbol rate (Rate'), data coder compression ratio (CR'), channel coding rate (r'), and interleaver depth (d') for delivery to the transmitter 114. U.S. patent application Serial No. 08/806,783 entitled "Method and Apparatus for an Adaptive Rate Communications System", which is hereby incorporated by reference, discloses a channel state estimation unit that can be used in the system of FIG. 13.

The feedback channel 318 can include virtually any means for transferring signals back to the transmitter 114. The feedback channel 318 is preferably a wireless channel and, in a duplex system, can be a part of a return signal from the receiver 118 to the transmitter 114.

In an alternate embodiment, the transmitter 114 and the receiver 118 are co-located. In this embodiment, rate control 312 is performed implicitly by the signal parameter extraction 220 in an open loop fashion, eliminating the need for feedback channel 318 in a full duplex configuration. In accordance with this embodiment, a sub-optimal transmit parameter set can be used.

Figure 14:
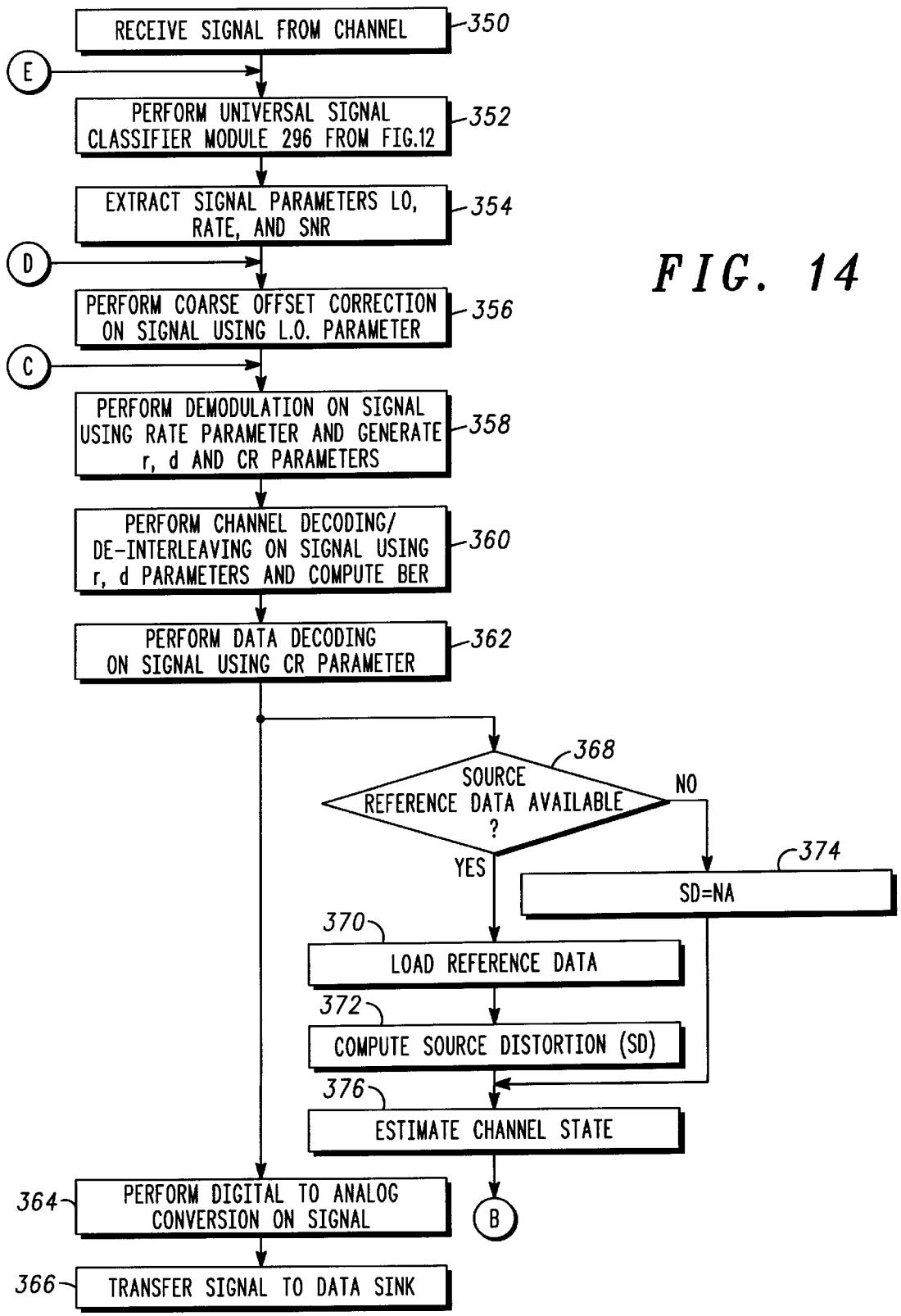
FIGS. 14 and 15 are a flowchart illustrating a method for processing an adaptive rate receive signal in accordance with another embodiment of the present invention.
Figure 15:
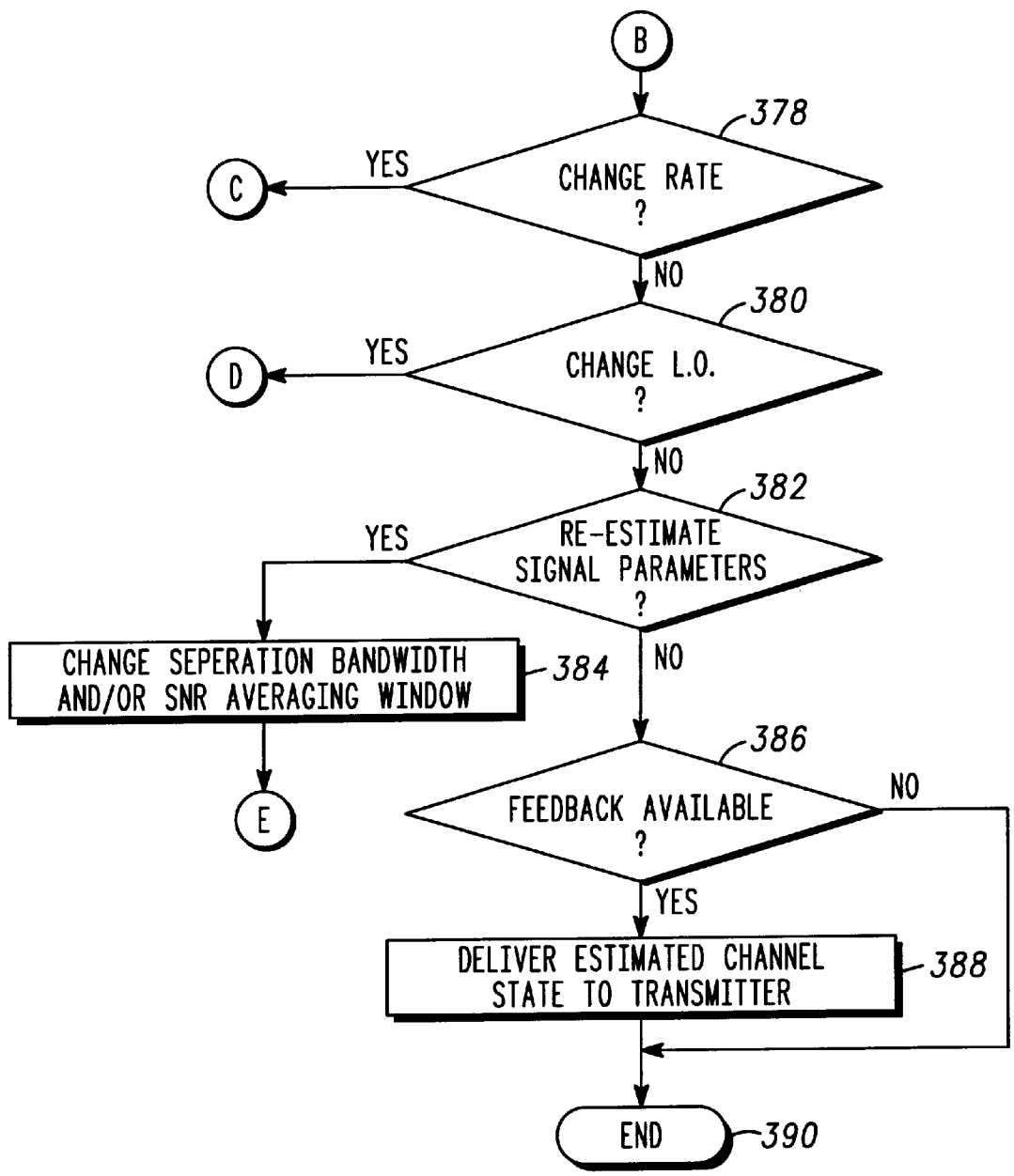

FIGS. 14 and 15 are a flowchart illustrating a method for processing an adaptive rate receive signal in accordance with another embodiment of the present invention. First, a signal is received from the channel (step 350). Next, the universal signal classifier module 296 of FIG. 12 is performed (step 352). Values are then extracted for signal parameters LO, Rate, and SNR (step 354). Using the LO parameter, a coarse offset correction is performed on the receive signal (step 356). The signal is then demodulated using the Rate parameter value and values for r, d, and CR are generated (step 358). Channel decoding and de-interleaving is next performed on the signal using the r and d parameter values and the BER is calculated (step 360). Data decoding is then performed on the signal using the CR parameter value (step 362). The signal is then converted to an analog representation (step 364) and delivered to the data sink 120 (step 366). At the same time, it is determined whether source reference data is available (step 368). If source reference data is available, the data is loaded and the source distortion (SD) is calculated (steps 370 and 372). If source reference data is not available, the SD is set to not available (NA) (step 374). The channel state is then estimated using the SNR, Rate, BER, and SD values (step 376).

It is next determined whether the Rate parameter value used to demodulate the receive signal is to be changed (step 378), based on the estimated modulation symbol rate, Rate', generated by the channel estimation unit 236. If it is, the method returns to step 358 and demodulation is repeated with the new symbol rate. If it is not, it is then determined whether the LO value used to downconvert the received signal is to be changed (step 380). If so, the method returns to step 356 and coarse offset correction is repeated with the new LO value. If the LO value is not to be changed, it is next determined whether the signal parameters need to be re-estimated (step 382). If so, the separation bandwidth and/or the SNR averaging window is changed (step 384) and the method returns to step 352 where the universal signal classifier module is repeated. If the signal parameters are not to be re-estimated, it is then determined whether a feedback channel to the transmitter 114 is currently available (step 386). If a feedback channel is available, the optimal transmit parameter information S is delivered to the transmitter (step 388) via the feedback channel. The method is then complete (step 390).

Figure 16:
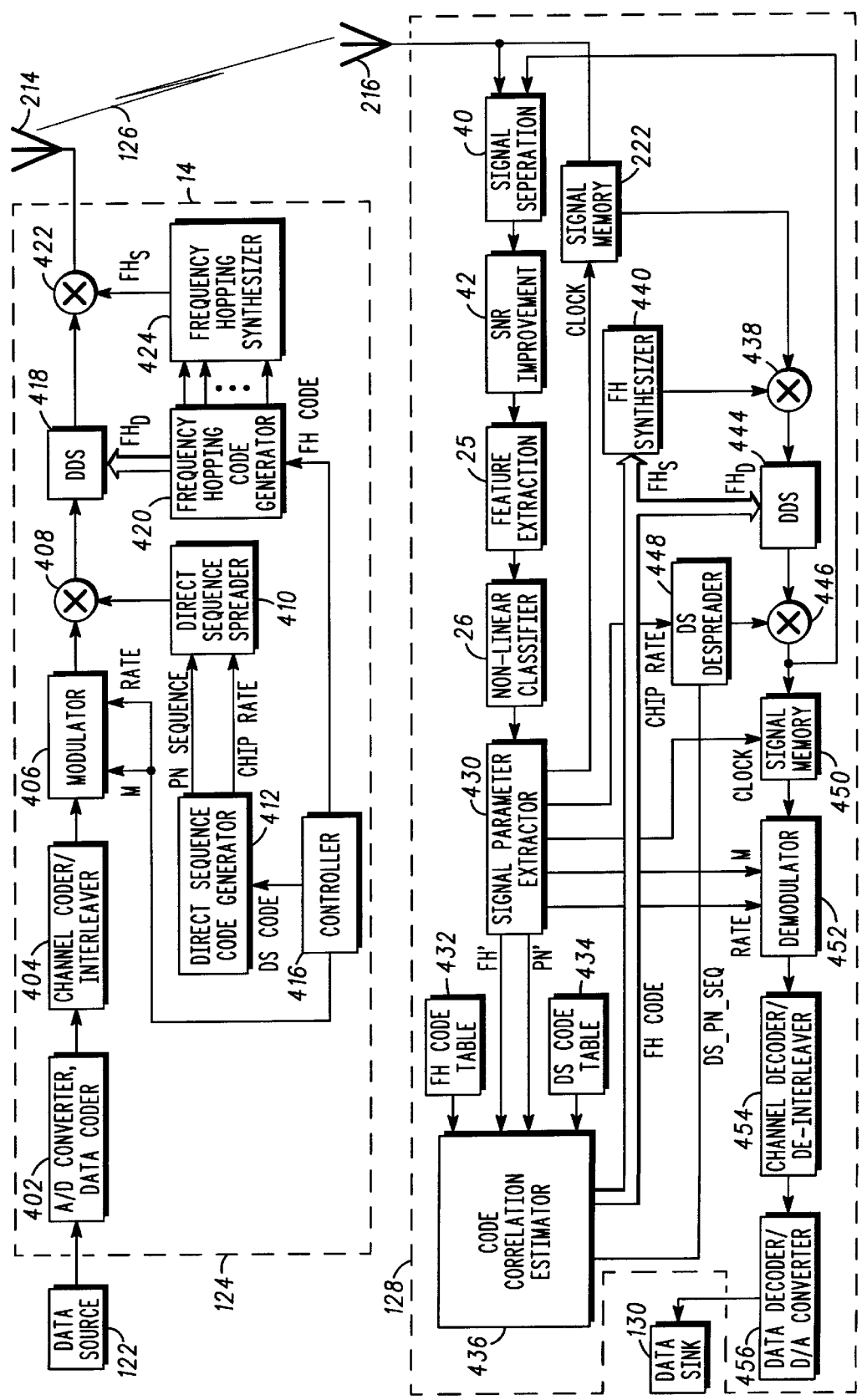
FIG. 16 is a block diagram illustrating a spread spectrum, USD communications system in accordance with one embodiment of the present invention.

FIG. 16 is a block diagram illustrating a spread spectrum, USD communications system 400 in accordance with another embodiment of the present invention. The system 400 includes: a data source 122, a transmitter 124, a channel 126, a receiver 128, and a data sink 130. The system is capable of performing communications using both direct sequence and frequency hopping spread spectrum techniques. Other spread spectrum techniques can also be implemented in accordance with the present invention. The receiver 128 is capable of receiving spread spectrum signals from the channel 126 and recovering the baseband information from the signal with no prior knowledge of the type of spread spectrum modulation (or other modulation or coding) that is present within the signal.

The transmitter 124 includes: an A/D converter/data coder 402, a channel coder/interleaver 404, a modulator 406, a direct sequence (DS) mixer 408, a DS spreader 410, a DS code generator 412, a controller 416, a direct digital synthesis (DDS) unit 418, a frequency hopping (FH) code generator 420, a FH mixer 422, and a FH synthesizer 424. As before, these elements are used to process a data signal from the data source 122 for transmission into the channel 126. The modulator includes an input for receiving modulation type, M, and modulation symbol rate, Rate, signals for use in modulating the data signal. The M and Rate signals are generated by the controller 416 which determines the type of modulation to be used for a particular transmission.

The DS mixer 408 and the DS spreader 410 are operative for providing DS spreading to the data signal in a manner that is well known in the art. The DS code generator 412 generates the pseudo noise (PN) sequence and chip rate that is used by the DS spreader 410 to spread the data signal. The controller 416 instructs the DS code generator on a particular form of spreading to be performed. The DDS unit 418 is operative for placement of the transmit spectrum into very fine resolution single or multiple hop patterns. The DDS unit 418 receives a frequency hopping code vector (FHD) from the FH code generator 420 indicating the desired transmit spectrum locations. The FH mixer 422 upconverts the data signal based on a varying LO signal received from the FH synthesizer 424. The FH synthesizer 424 determines the frequency of the LO signal based on input from the FH code generator 420 which receives instructions from the controller 416. After upconversion, the data signal is transmitted into the channel 126 via antenna 214.

The receiver 128 includes: a signal separation unit 40, a SNR improvement unit 42, a feature extraction unit 25, a non-linear classifier 26, a signal parameter extraction unit 430, an FH code table 432, a DS code table 434, a code correlation estimator 436, a signal memory 222, an FH mixer 438, an FH synthesizer 440, a DDS unit 444, a DS mixer 446, a DS de-spreader 448, a signal memory 450, a demodulator 452, a channel decoder/de-interleaver 454, and a data decoder/DAC 456. A signal is received from the channel 126 by antenna 216. The signal is then processed in the signal separation unit 40, the SNR improvement unit 42, the feature extraction unit 25, and the non-linear classifier 26 as previously described. The signal parameter extraction unit 430 then extracts a frequency hopping code estimate, FH', a direct sequence code estimate, PN', and a chip rate parameter. The frequency hopping code estimate, FH', and the direct sequence code estimate, PN', are each delivered to the code correlation estimator 436 to determine the most probable frequency hopping code $FH_D$ and $FH_S$ and pseudo-noise code DS_PN_SEQ associated with each of FH' and PN'. A code correlation estimate is performed in the code correlation estimator 436 using autocorrelations as follows:

$$R_{FH}(j) = \underset{k}{\mathrm{argmax}}\{\theta_{FH\,\hat{FH}}(k)\}; \quad j = 1 \text{ to } P_{FH} \qquad \text{Eq. 25}$$

$$R_{PN}(l) = \underset{k}{\mathrm{argmax}}\{\theta_{PN\,\hat{PN}}(k)\}; \quad l = 1 \text{ to } P_{DS}$$

The results of the autocorrelations are then used to classify the codes and generate a frequency hopping (FH) code and a direct sequence pseudo-noise sequence DS_PN_SEQ. These are calculated as follows:

FH code=$FH(m)$, where $m=\text{argmax}(R_{FH}(j))$

DS_PN_SEQ=$PN(p)$, where $p=\text{argmax}(R_{PN}(l))$   Eq. 26

The FH mixer 438 receives a copy of the receive signal from the signal memory 222 and downconverts the signal using an LO signal generated by FH synthesizer 440. The FH synthesizer 440 receives an input signal $FH_S$ from the code correlation estimator 436 from which it determines the appropriate LO frequency. The DDS unit 444 receives a signal, $FH_D$, from the code correlation estimator 436 and uses it to perform direct digital synthesis downconversion of single or multiple hop sets with very high resolution and frequency accuracy. The direct sequence spreading is next removed from the signal using the DS mixer 446 and the DS despreader 448. The DS despreader 448 uses the chip rate signal from the signal parameter extraction unit 430 and the DS_PN_SEQ signal from the code correlation estimator 436 to facilitate the despreading.

After all signal despreading is complete, a copy of the "despread" receive signal is stored in the signal memory 450 to await further processing. The despread signal is also delivered back to the signal separation unit 40 to be reprocessed through the classifier circuitry for further classification and parameter extraction. On this second pass through the classifier circuitry, the signal parameter extraction unit 430 extracts values for modulation type, M, and modulation symbol rate, Rate. These parameters values are delivered to the demodulator 452 where they are used to demodulate the signal that is stored in the signal memory 450. The signal parameter extraction unit 430 can also extract other parameters for use in processing the "despread" signal. The signal is next channel decoded, de-interleaved, data decoded, and digital-to-analog converted in the channel decoder/deinterleaver 454 and the data decoder/DAC 456, respectively. The recovered information is then transferred to the data sink 130.

Figure 17:
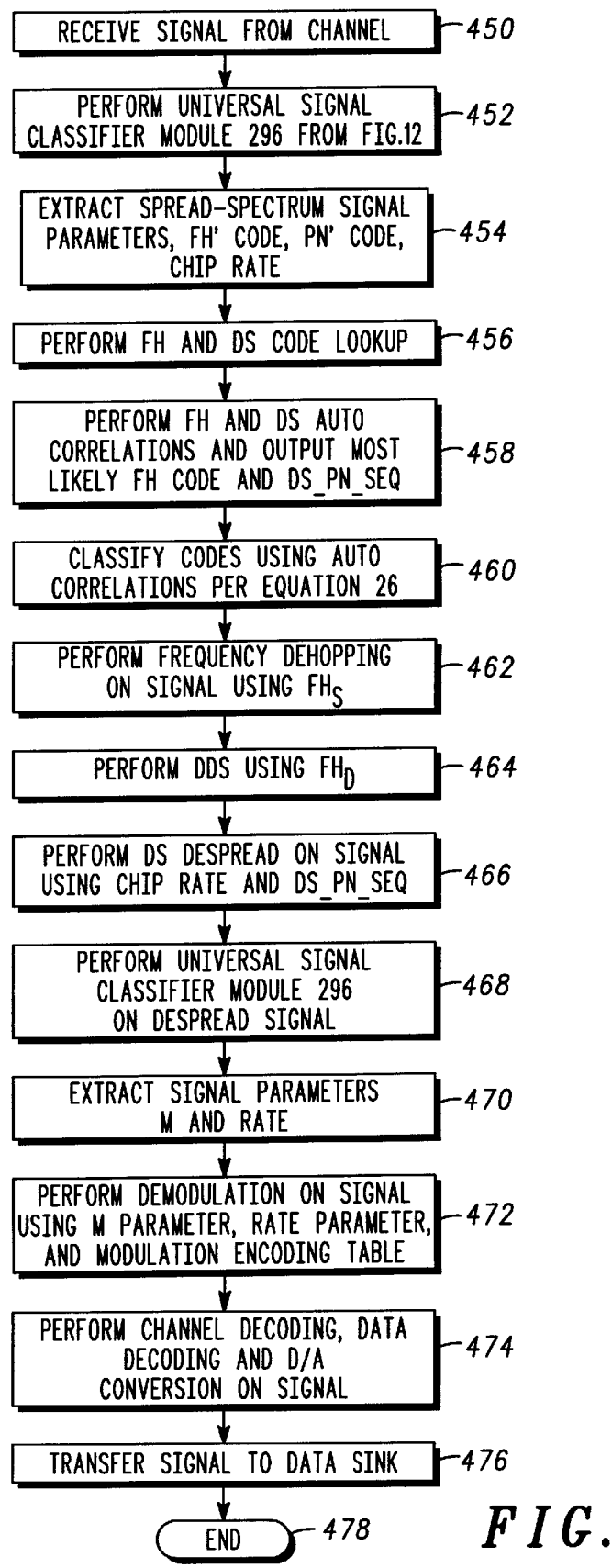
FIG. 17 is a flowchart illustrating a method for processing a spread spectrum receive signal in accordance with one embodiment of the present invention.

FIG. 17 is a flowchart illustrating a method for processing a spread spectrum receive signal in accordance with another embodiment of the present invention. First, a signal is received from the channel (step 450). The universal signal classifier module 296 from FIG. 12 is then performed on the signal (step 452). Spread spectrum signal parameters (e.g., FH' code, PN' code, and chip rate) are then extracted from the signal (step 454). Code correlations are then performed by computing an auto correlation between FH' and the code values in the FH code table 432 and between PN' and the code values in the DS code table 434. The FH code and DS_PN_SEQ signals are generated by choosing the most likely code from the FH and DS code tables, which is produced from the maximum correlation value (step 458). The codes are classified using the auto-correlations per equation 26 (step 460). Frequency dehopping is then performed using an $FH_S$ signal from the FH code (step 462) and DDS is performed using an $FH_D$ signal from the FH code (step 464). Direct sequence despreading is next performed on the signal using the chip rate and the DS_PN_SEQ signal (step 466).

The universal signal classifier module is then performed again on the despread signal (step 468). Parameters values for modulation type, M, and modulation symbol rate, Rate, are extracted (step 468). The despread signal is then demodulated using the M parameter value, the Rate parameter value, and a modulation encoding table (step 472). Channel decoding, data decoding, and D/A conversion are then performed on the signal (step 474) and the resulting information is delivered to the data sink 130 (step 476), thus completing the method (step 478).

It should be noted that the USD communications systems illustrated in FIGS. 11, 13, and 16 can also be implemented with signal classifiers other than the non-linear classifier of the present invention. However, for the reasons stated herein, use of a non-linear classifier in accordance with the present invention provides many advantages over conventional classification schemes.

What is claimed is:

1. A receiver for use in a communications system, said receiver comprising:

a signal receptor for receiving a communications signal from a communications channel;

a feature extraction unit for extracting at least one feature from said communications signal, said at least one feature forming a feature set;

a non-linear classifier for classifying said communications signal according to signal type, said non-linear classifier including a polynomial expansion unit for performing a polynomial expansion on said at least one feature to generate an expanded feature set, said non-linear classifier using said expanded feature set to classify said communications signal;

a signal processor for processing said communications signal based on signal type determined by said non-linear classifier;

said non-linear classifier includes a model memory for storing a plurality of signal classification models, each signal classification model corresponding to a particular signal type in a signal type set;

said non-linear classifier includes a combination unit for combining said expanded feature set with each of said plurality of signal classification models to produce at least one combination value set for each of said plurality of signal classification models;

said expanded feature set includes at least one expanded feature vector;

said signal classification models each include at least one signal classification vector; and said combination unit includes means for finding a vector dot product between an expanded feature vector and a signal classification vector.

2. The receiver, as claimed in claim 1, wherein:

said non-linear classifier includes a scoring unit for determining a score for each of said signal classification models based on said at least one combination value set associated therewith.

3. The receiver, as claimed in claim 2, wherein:

said scoring unit includes means for determining an average value for said at least one combination value set.

4. The receiver, as claimed in claim 2, wherein:

said non-linear classifier includes a selection unit for selecting a signal classification model having a best score.

5. The receiver, as claimed in claim 1, further comprising:

a signal preconditioning unit, located between said signal receptor and said feature extraction unit, for conditioning said communications signal in a manner that facilitates extraction of features.

6. The receiver, as claimed in claim 5, wherein:

said signal preconditioning unit includes means for improving a signal-to-noise ratio (SNR) of said communications signal.

7. The receiver, as claimed in claim 6, wherein:

said means for improving includes means for estimating a bandwidth of a component of said communications signal.

8. The receiver, as claimed in claim 7, wherein:

said means for estimating a bandwidth includes means for converting said communications signal to a frequency domain representation including frequency domain coefficients.

9. The receiver, as claimed in claim 8, wherein:

said means for estimating a bandwidth includes means for determining a noise floor for said signal using said frequency domain coefficients.

10. The receiver, as claimed in claim 7, wherein:

said means for improving includes means for filtering out portions of said communications signal outside said estimated bandwidth.

11. The receiver, as claimed in claim 6, wherein:

said means for improving includes a phase domain filter for filtering de-aliased phase components of the communications signal.

12. The receiver, as claimed in claim 5, wherein:

said signal preconditioning unit includes means for separating a desired component of said communications signal from an interference component of said communications signal.

13. The receiver, as claimed in claim 1, wherein:

said non-linear classifier operates in a multi-resolutional mode wherein classification is performed in a plurality of classification levels.

14. The receiver, as claimed in claim 1, wherein:

said feature extraction unit operates in a multi-resolutional mode wherein feature extraction is performed in a plurality of feature classification levels.

15. The receiver, as claimed in claim 1, wherein:

said feature extraction unit and said non-linear classifier operate in a multi-resolutional mode.

16. The receiver, as claimed in claim 1, wherein:

said feature extraction u nit includes a second non-linear classifier including a second polynomial expansion unit, wherein said second non-linear classifier is used to determine features to be extracted.

17. The receiver, as claimed in claim 1, wherein:

said signal processor includes a parameter extraction unit for extracting parameter values from said communications signal, wherein the parameters for which values are extracted depend upon the signal type determined by the non-linear classifier.

18. The receiver, as claimed in claim 1, wherein:

said signal processor includes a differential decoder for removing differential encoding (DE) from said communications signal, said differential decoder being responsive to at least one control signal that indicates a form of differential encoding present in said communications signal, wherein said at least one control signal is generated using said signal type determined by said non-linear classifier.

19. The receiver, as claimed in claim 1, wherein:

said signal processor includes a demodulator for demodulating said communications signal, said demodulator being responsive to at least one control signal that indicates a form of modulation present in said communications signal, wherein said at least one control signal is generated using said signal type determined by said non-linear classifier.

20. The receiver, as claimed in claim 1, wherein:

said signal processor includes means for determining a form of spread spectrum modulation that is present in said communications signal using said signal type determined by said non-linear classifier, said means for determining including means for generating at least one control signal indicative of said form of spread spectrum modulation.

21. The receiver, as claimed in claim 20, wherein:

said means for determining a form of spread spectrum modulation includes means for determining a frequency hopping code and means for determining a pseudo noise code.

22. The receiver, as claimed in claim 20, wherein:

said signal processor includes means for removing spread spectrum modulation from said communications signal to generate an output signal, said means for removing being responsive to said at least one control signal generated by said means for generating.

23. The receiver, as claimed in claim 22, wherein:

said signal processor includes feedback means for use in transferring said output signal back to said non-linear classifier for further classification.

24. A receiver for use in a communications system, comprising:

a signal receptor for receiving a communications signal from a communications channel;

a feature extraction unit for extracting at least one feature vector from said communications signal, each of said at least one feature vector corresponding to a different feature of said communications signal;

a non-linear classifier, coupled to said feature extraction unit, for classifying said communications signal according to signal type, said non-linear classifier including:

a polynomial expansion unit for expanding said at least one feature vector by generating cross-products between elements of said at least one feature vector to generate at least one expanded feature vector;

a model memory storing a plurality of signal classification models for use in classifying said communications signal, wherein each of said signal classification models corresponds to a predetermined signal type;

a combination unit for combining said at least one expanded feature vector with each of at least two signal classification models in said model memory to produce at least two combination value sets, wherein each combination value set corresponds to a different signal classification model; and means for comparing said at least two combination value sets to determine a most likely signal type for said communications signal;

a signal processor for processing said communications signal using said classification signal;

each of said plurality of signal classification models includes at least one classification vector; and said combination unit includes means for calculating a vector dot product between an expanded feature vector and a classification vector within a first signal classification model.

25. The receiver, as claimed in claim 24, wherein:

said at least one expanded feature vector includes multiple expanded feature vectors; and said combination unit includes means for calculating a vector dot product between each of said multiple expanded feature vectors and a classification vector within said first classification model to generate a first combination value set, wherein said first combination value set includes as elements thereof the results of the vector dot products.

26. The receiver, as claimed in claim 24, wherein said means for comparing comprises:

a scoring unit for determining a score for each of said at least two signal classification models using said at least two combination value sets; and a selection unit for selecting one of said at least two signal classification models based on scores determined by said scoring unit, said selection unit outputting a classification signal that is indicative of a signal type associated with said selected signal classification model.

27. The receiver, as claimed in claim 26, wherein:

each of said at least two combination value sets comprises a combination vector; and said scoring unit calculates an average value for elements in each combination vector to determine a score for a corresponding signal classification model.

28. The receiver, as claimed in claim 27, wherein:

said selection unit selects a signal classification model having a highest average value.

29. The receiver, as claimed in claim 24, wherein:

said means for comparing outputs a signal identifying a number of different signal types and indicating a probability that each of said number of different signal types is the signal type of the communications signal being tested.

30. An apparatus for performing signal classification in a communications system, said apparatus comprising:

an input for receiving at least one feature vector associated with a communications signal;

a polynomial expansion unit, coupled to said input, for performing a polynomial expansion on said at least one feature vector, said polynomial expansion unit outputting at least one expanded feature vector; and a testing unit, coupled to said polynomial expansion unit, for determining a signal type of said communications signal, said testing unit comprising:

a model memory for storing a plurality of signal classification models, wherein each of said plurality of signal classification models corresponds to a predetermined signal type that is recognized by said apparatus;

a combination unit, coupled to said model memory and said polynomial expansion unit, for combining said at least one expanded feature vector with at least two of said plurality of signal classification models to generate at least two combination value sets, wherein each combination value set corresponds to a different signal classification model;

means for comparing said at least two combination value sets to determine a signal type of said communications signal;

a training unit coupled to said polynomial expansion unit for training said apparatus to recognize a new signal type, said training unit including:

means for receiving a first expanded feature set from said polynomial expansion unit for a signal having said new signal type; and means for generating a new signal classification model for said new signal type using said first expanded feature set; and means for storing said new signal classification model in said model memory without modifying other signal classification models in said model memory, wherein said other signal classification models in said model memory are still capable of use in identifying signal type even though said other signal classification models have not been modified.

31. The apparatus, as claimed in claim 30, wherein:

said polynomial expansion unit calculates cross products of vector elements within said at least one feature vector up to a desired order n.

32. The apparatus, as claimed in claim 30, further comprising:

a mode switch coupled to said polynomial expansion unit, said testing unit, and said training unit for directing expanded feature sets from said polynomial expansion unit to either said testing unit or said training unit based on a control signal received from a controller.

33. The apparatus, as claimed in claim 32, further comprising:

out-of-class logic, coupled to an output of said testing logic, for determining when a first communications signal does not fall within a recognized signal type, said out-of-class logic including means for instructing the controller to train the apparatus to recognize a signal type of said first communications signal.

34. In a communications system that includes a signal classifier for classifying a receive signal according to a plurality of recognized signal types, an apparatus for use in training the signal classifier to recognize a new signal type, said apparatus comprising:

a model memory for storing signal classification models corresponding to the plurality of recognized signal types, said signal classification models for use by the signal classifier in classifying the receive signal;

a model generation unit for generating a new signal classification model, corresponding to the new signal type, for storage in said model memory, wherein said new signal classification model can be generated and stored in said model memory without modifying signal classification models previously stored in said model memory, wherein said signal classification models previously stored in said model memory are still capable of use in classifying the receive signal after said new signal classification model has been stored even though they have not been modified;

said model memory includes signal classification models that are organized based on corresponding values for two or more signal characteristics;

said model memory includes signal classification models arranged in rows and columns, wherein said rows each correspond to a different value of a first signal characteristic and said columns each correspond to a different value of a second signal characteristic; and said rows each correspond to a different signal class and said columns each correspond to a different signal-to-noise ratio (SNR).

35. The apparatus, as claimed in claim 34, wherein:

said model generation unit includes an input for receiving a feature set corresponding to said new signal type.

36. The apparatus, as claimed in claim 35, wherein:

said feature set includes at least one feature vector that has been expanded using a polynomial expansion.

37. The apparatus, as claimed in claim 34, wherein:

said signal classification models are organized in levels, wherein each level corresponds to a particular signal characteristic.

38. The apparatus, as claimed in claim 34, wherein:

said signal classification models are organized to support multi-resolutional signal classification.

39. The apparatus, as claimed in claim 34, further comprising:

a feature extraction unit for extracting at least one feature vector from an input signal having the new signal type, said at least one feature vector describing at least one feature of said input signal; and a polynomial expansion unit for performing a polynomial expansion on said at least one feature vector by calculating cross products of elements of said at least one feature vector and adding said cross products to said at least one feature vector as further elements of said at least one feature vector to produce at least one expanded feature vector;

wherein said polynomial expansion unit is coupled to said model generation unit for delivering said at least one expanded feature vector to said model generation unit.

40. The apparatus, as claimed in claim 39, wherein:

said at least one expanded feature vector includes a plurality of expanded feature vectors; and said model generation unit includes means for determining a high order correlation vector for the new signal type by adding together said plurality of expanded feature vectors using vector addition.

41. The apparatus, as claimed in claim 40, wherein:

said model generation unit includes means for determining a high order correlation sum vector for the plurality of recognized signal types by adding together high order correlation vectors associated with each of the plurality of recognized signal types including the high order correlation vector associated with the new signal type.

42. The apparatus, as claimed in claim 41, wherein:

said model generation unit includes means for determining a scaled high order correlation vector for the new signal type using said high order correlation sum vector.

\* \* \* \* \*